US005552172A

United States Patent [19]

Liebermann

[11] Patent Number: 5,552,172
[45] Date of Patent: Sep. 3, 1996

[54] MULTI-DECK CLAMSHELL COOKING AND STAGING PROCESS

[76] Inventor: Benno E. Liebermann, 2805 Lime Kiln La., Louisville, Ky. 40222

[21] Appl. No.: 477,408

[22] Filed: Jun. 7, 1995

Related U.S. Application Data

[63] Continuation of Ser. No. 229,581, Apr. 19, 1994.

[51] Int. Cl.⁶ ........................................ A23L 1/00
[52] U.S. Cl. .................. 426/232; 426/233; 426/523
[58] Field of Search ............................ 426/231, 233, 426/523, 232

[56] References Cited

U.S. PATENT DOCUMENTS

| | | | |
|---|---|---|---|
| 3,455,232 | 10/1967 | Oliver, Jr. | 99/407 |
| 3,555,993 | 1/1971 | Garcia | 99/416 |
| 3,622,356 | 11/1971 | Long | 426/521 |
| 3,961,090 | 6/1976 | Weiner et al. | 426/523 |
| 4,210,675 | 7/1980 | Liebermann | 426/233 |
| 4,216,241 | 8/1980 | Thompson | 426/496 |
| 4,224,862 | 9/1980 | Liebermann | 99/473 |
| 4,244,284 | 1/1981 | Flavan, Jr. et al. | 426/244 |
| 4,278,697 | 7/1981 | Liebermann | 426/523 |
| 4,487,116 | 12/1984 | Routhier | 99/339 |
| 4,512,250 | 4/1985 | Schindler | 426/523 |
| 4,697,504 | 10/1987 | Keating | 99/331 |
| 4,737,373 | 4/1988 | Forney | 426/523 |
| 4,749,582 | 6/1988 | Wardell | 426/523 |
| 4,909,137 | 3/1990 | Brugnoli | 99/444 |
| 4,972,766 | 11/1990 | Anetsberger | 99/332 |
| 5,008,123 | 4/1991 | Bewley et al. | 426/523 |
| 5,039,535 | 8/1991 | Lang et al. | 426/233 |
| 5,094,864 | 3/1992 | Pinou et al. | 426/233 |
| 5,156,873 | 10/1992 | Skruetta | 426/523 |
| 5,163,359 | 11/1992 | McLane | 99/447 |
| 5,200,225 | 4/1993 | Apaydin | 426/523 |
| 5,247,874 | 9/1993 | George, II et al. | 99/330 |
| 5,404,935 | 4/1995 | Liebermann | 99/470 |

FOREIGN PATENT DOCUMENTS 2159872  12/1985  United Kingdom.

OTHER PUBLICATIONS

Paul George, *Design News*, "Oil Heat Exchanger Speeds Burger Preparation," Batelle Memorial Institute, 505 King Ave. Columbus, OH 43201 (Exhibit C).

*Primary Examiner*—George Yeung
*Attorney, Agent, or Firm*—Middleton & Reutlinger; David W. Carrithers

[57] ABSTRACT

The present invention is directed toward a method for transferring heat to food articles for cooking or staging ensuring bacteriological safety in the fast food production of hamburgers and other protein or farinaceous food articles. The process provides a means to initially cook frozen food articles sealed in heat conducting containers, such as a flexible pouch to cook raw food articles or previously cooked food articles, and to stage same for prolonged time periods at optimum product quality at a selected low temperature, thereby assuring precision, time and temperature-related, pathogenic risk management and food safety for public consumption. The process provides a means of holding the patties and/or other food articles encased in suitable plastic packages for prolonged time periods at an equilibrated, safe internal temperature range, selectable between 130° and 185° F., which temperature range is optional and maintained in order to guarantee bacteriological food safety by achieving 99.999% thermal lethality of trace pathogens potentially present in ground meat articles such as beef or chicken patties.

28 Claims, 12 Drawing Sheets

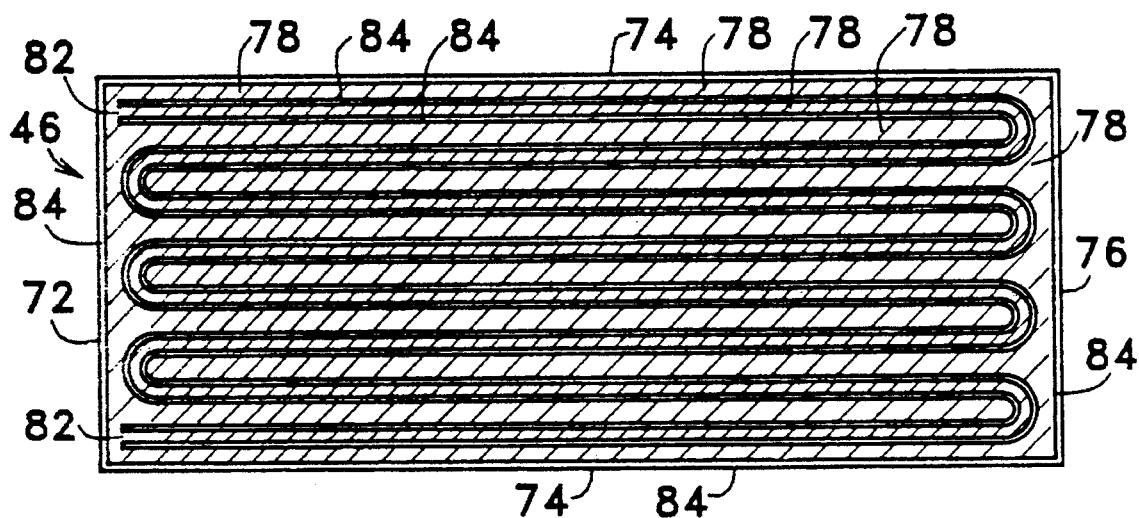
FIG. 11
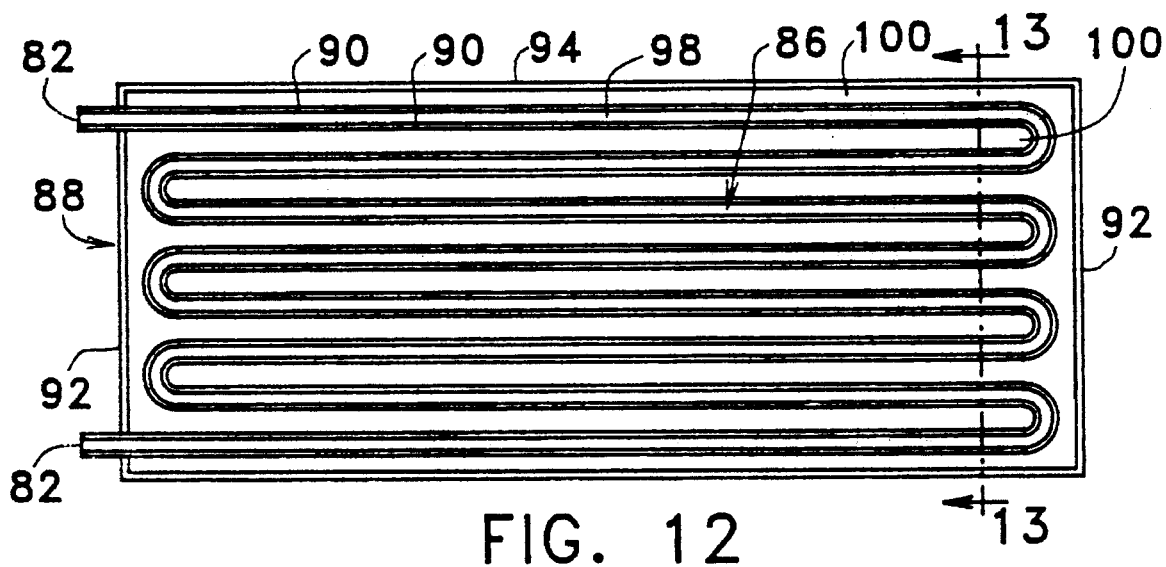
FIG. 12
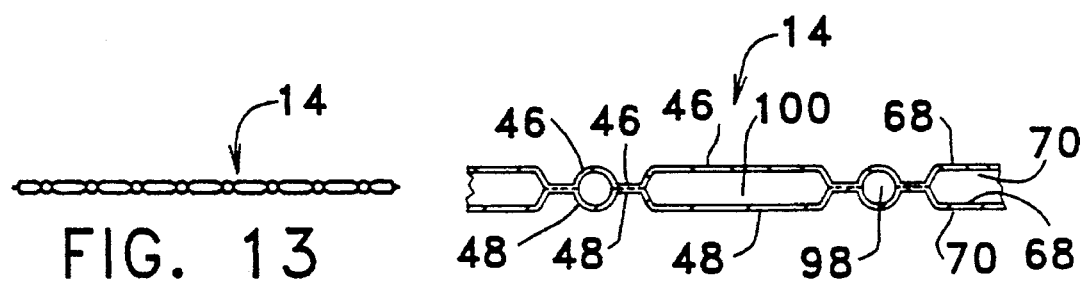
FIG. 13
FIG. 14

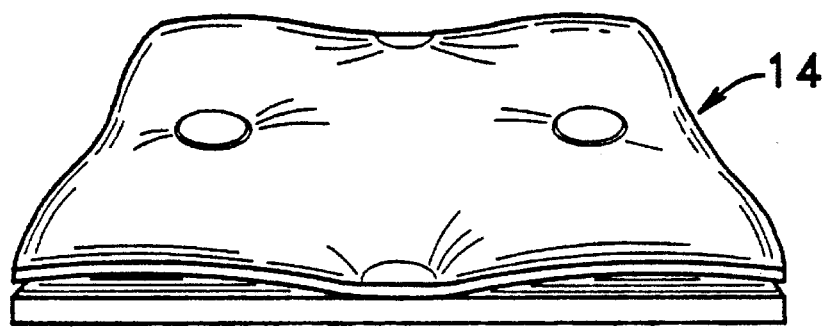
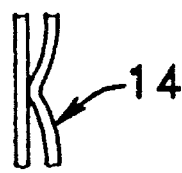
FIG. 21    FIG. 22
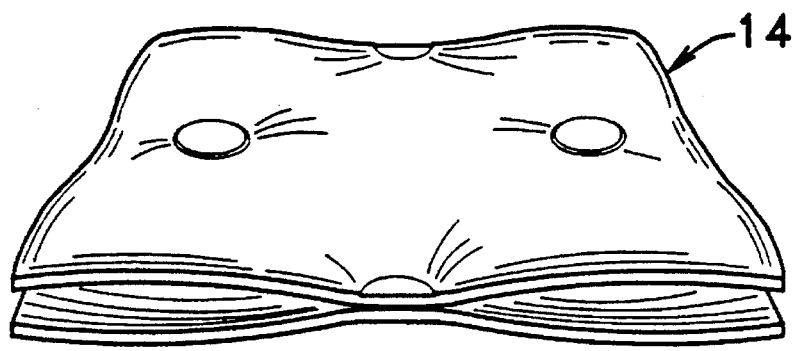
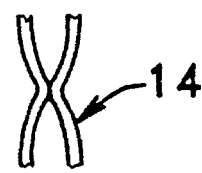
FIG. 23    FIG. 24
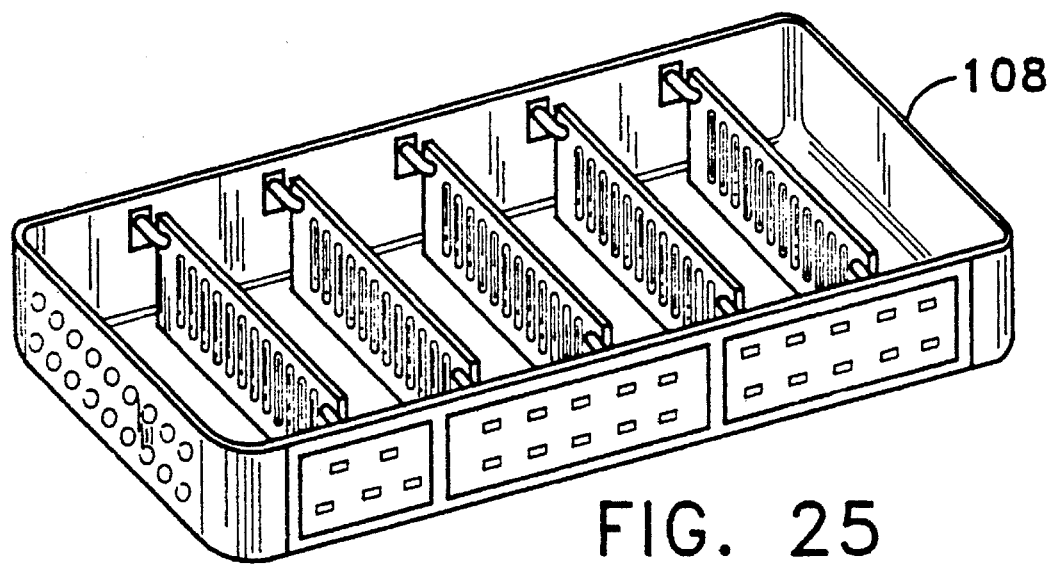
FIG. 25

MULTI-DECK CLAMSHELL COOKING AND STAGING PROCESS

This application is a Continuation of U.S. patent application Ser. No. 08/229,581 filed Apr. 19, 1994.

BACKGROUND OF THE INVENTION

The present invention relates to a process, a method of, and an apparatus for transferring heat to food articles and, more particularly, to a novel process, method of and apparatus for such purpose, that are particularly adapted for either cooking from frozen or fresh state or for holding previously cooked food articles, equilibrated to a preferred, pathogenically safe internal temperature for prolonged time periods, and which can also be employed to initially cook food articles or to complete the cooking cycle for food articles that have previously been partially cooked, or are fresh-frozen and packaged for cooking in a plastic pouch, hermetically sealed and relatively free of oxygen for extension of the food article's shelf life in frozen format for periods of up to one year.

The multi-deck clamshell cooking and staging grill of the present invention utilizes conduction and radiation heat transfer dynamics relevant to low-temperature cooking and staging of non-cured meats, particularly ground red meats such as hamburger beef patties. *Escherichia coli* 0157:H7 and other pathogenic risks are reflected herein as a food safety risk management process and the apparatus to consistently and repetitiously achieve it.

In regard to retail mass feeding of commercial-level, grilled hamburger products, the bacteriological and pathogenic food safety, color, moisture content, and texture uniformity of the product is of primary concern to the ultimate consumer. The physical characteristics reflect the reference point of quality standards associated with this commodity meat product. Hamburger products which are cooked by high-heat, high-speed grilling processes are subject to considerable moisture weight losses during any cooking-grilling processes, and require stringent bacteriological safety monitoring.

It must be understood that the energy of heat (i.e., Btu's) can be transferred to any respective product by many different means, yet the key issue is always directly related to the optimum "efficiency factor" associated with any heat transfer processing technique, in this case from a heat source to a food article. The mass production of grilled hamburger products in the fast food service industry is presently accomplished via several conventionally practiced methods, such as the open grill or flame grill, both high-temperature grills utilized extensively worldwide each of which is either electrically or gas-fired.

Conventionally practiced grilling procedures rely on the heat transfer by conduction from a heated grill surface to the respective food article. From a technically descriptive, factual point of view, any plate surface that can be heated by whatever means (e.g., electrical, gas or circulated liquid heat transfer media) is considered to be rightfully designated as a "grill," irrespective of any specific operational surface temperature achievable by various temperature control means. In simple terms, any plate that can be heated to and controlled at an operationally safe temperature can legally be designated as a grill surface plate. Even a cold plate is considered a grill, if the plate is equipped with heating means to achieve a rise in grill surface temperature capable of achieving thereby a desired temperature transfer via a specific process objective to a food article, based on a specific time-temperature heat transfer curve.

The desired internal product temperature achievement, from either frozen or refrigerated food product state, depends therefore on the time span of the food article's exposure to the time span required to achieve a desired internal product temperature. This process, conventionally practiced, has been proven over many years of practice to steadily fail in guaranteeing the consistent, dependably reproducible achievement of a precise internal product temperature within the narrow range of ±2° F., in the millions of product grilling cycles performed daily throughout the industry on a worldwide basis.

Thermal lethality (i.e., destruction) of pathogenic bacteria such as *Escherichia coli* 157:H7 to a safety factor of 99.999% requires a precise time-temperature relationship, which must be consistently achieved with absolute perfection millions of times per day. The cross-sectional color profile of an uncured, cooked meat product, however, is, a function of temperature alone—time is an irrelevant factor. The cross-sectional "color" of a cooked meat patty (i.e., a grilled hamburger), therefore, is a function of the ultimate internal product temperature reached and maintained for the staging (i.e., holding) period. We demonstrate that the hemoglobin present in red meat is sensitive to color development only with respect to precise internal product temperature, and is therefore not dependent upon any certain of length of time during which the hamburger patty is exposed to precisely controlled (to within the narrow range of ±2° F., at temperature variances from 150° to 165° F.), internal or external product temperatures commonly practiced in conventional cooking, grilling and staging processes.

It is therefore physically impossible to evaluate a cooked food product by its color and ensure that conventionally cooked (i.e., grilled) fast food hamburgers achieve exact, pathogenically safe, optimum internal temperatures within specific time spans due to uncontrollable hot and cold spots which are inherent shortcomings of conventional grills. Restaurants currently cook (i.e., grill) hamburgers, and then usually store (i.e., "hold" or "stage" ) them temporarily in various, high moisture-generating heating units developed by the industry for that function. The quality of products staged in such equipment deteriorates rapidly, due to degradation of the product in terms of moisture loss, declining flavor intensity, cosmetic appearance and "mouth feel," and, most importantly, uncontrollable pathogenic risk management affecting the food product's safety for consumption and resulting in an organoleptically stewed meat profile.

The lower an end internal product temperature factor is achieved, the lighter the pink color will be maintained in the ground meat product's cross-section. Conversely, the higher the internal temperature of the product is elevated, the darker the meat patty's color will develop until, in due time, the product's cross-section turns grayish brown in color at the point of full doneness (in the range of 155° to 165° F.).

Since scientifically verified regulations were published by the USDA and FDA in the Federal Register in 1993, specifying mandatory guidelines and establishing a standard, precise time-temperature relationship for guaranteed thermal lethality of pathogenic organisms in uncured ground meat patties for the industry to implement and practice, it became evident that in practice, under "real world" conditions, these objectives and regulations cannot be consistently achieved via conventional grilling equipment and procedures as currently practiced in the industry worldwide.

Until quite recently (prior to 1991) thermal lethality (i.e., "thermal kill") directives for dangerous pathogens in food articles, published by the U.S. Department of Agriculture [hereinafter "USDA"], required that a ground beef patty be thermalized (i.e., cooked) on a grill to an internal temperature of at least 145° F., and then maintained at a 145° F. internal temperature for staging (i.e., "holding hot" storage). Due to the subsequent discovery of increased heat resistance of lethal pathogens in food products, as revealed during ongoing, extensive research by the federal authorities to clearly identify public health hazards, in 1993 the USDA and the U.S. Food and Drug Administration [hereinafter "FDA"]dramatically increased their directives'internal food cooking temperature mandates in order to assure public food safety in accordance with the time- and temperature-related cooking requirements represented by Table I and Table II, and mandated into compliance law as published in the Federal Register.

Table I shows the Time-Temperature Cooking Requirements As Mandated by the USDA prior To 1991. The data for Table I is shown for the time/temperature combination for cooked ground beef, cooked beef, roast beef, and cooked corned beef as follows:

TABLE I

| Minimum internal temperature (Degrees Fahrenheit) | Minimum processing time in minutes after minimum temperature is reached |
|---|---|
| 130 | 121 |
| 131 | 97 |
| 132 | 77 |
| 133 | 62 |
| 134 | 47 |
| 135 | 37 |
| 136 | 32 |
| 137 | 24 |
| 138 | 19 |
| 139 | 15 |
| 140 | 12 |
| 141 | 10 |
| 142 | 8 |
| 143 | 6 |
| 144 | 5 |
| 145 | Instantly |

Table II shows the Time-Temperature Cooking Requirements As published by the USDA in 1993. The data for Table II is also shown for the time/temperature combination for cooked beef, roast beef, and cooked ground beef as follows:

TABLE II

| Minimum internal temperature (Degrees Fahrenheit) | Minimum processing time after minimum temperature is reached (Seconds) |
|---|---|
| 151 | 41 |
| 152 | 32 |
| 153 | 26 |
| 154 | 20 |
| 155 | 16 |
| 156 | 13 |
| 157 | 10 |
| 158 | 7 |
| 159 | 4 |
| 160 | 1 |

Based on these recently recognized facts the issue of precise and repetitiously consistent, internal product temperature control, in relation to product staging (i.e., holding) time, becomes the single most critical factor in the attempt to guarantee both bacteriological (i.e., pathogenic) product safety, as well as a consistently high level of end product first quality attributes, which are dependent on the maximum retention of moisture in the meat patty, by which organoleptic product quality attributes are subconsciously measured for reference by the consuming public.

Thus, regardless of the specific cooking (i.e., grilling) technology deployed in processing hamburger products, via either conduction heat, convection heat or steam heat, also known as "wet cooking," the precise and consistent internal product temperature control factor, to be attained and maintained according to USDA regulations in each beef patty unit irrespective of minute, individual weight variances existing in the total batch, is the single most critical quality control factor affecting the food safety, optimum yield (i.e., moisture retention) and uniform doneness specifications of the end product, replicable millions of times per day absent any reliance on human judgment and without the danger of potential human-error jeopardizing food safety.

If grilling temperatures higher than the ultimately desired internal product temperature of 155° to 165° F. are utilized during a cook cycle, then, regardless of the specific grilling heat source, the desired internal product temperature of each individual beef patty will be reached at time and temperature variations directly related to differences in unit weight, mass, and moisture and fat percentages. Consequently patties with relatively lower single-unit weights, when exposed to elevated grill temperatures ranging from 350° up to 425° F., depending on the cooking methodology utilized, will attain higher internal temperatures within the same given time span than will those patties with greater unit weights.

It is emphasized that precise control of individual unit weight factors in mass produced, ground meat patties, to within a variance of less than ±0.01 to 0.0125 grams per single product unit, is economically unfeasible. Any attempt to further narrow this weight tolerance per single ground meat patty unit is not justified, as such would increase the product's end price on the marketplace above a competitive "commodity" level.

Consequently, the only option available to precisely control the internal temperatures of individual ground meat patty product cooked (i.e., grilled), in small or large batches, irrespective of their variable single unit product weight factors, is by exposure of the total volume of products to a conduction heat transfer environment maintained precisely at, and not higher than, the end temperature desired as the ultimate internal product temperature for the entire batch. Under these conditions all single patties, regardless of their variable unit weights, will ultimately equilibrate at an identical internal product temperature, within the narrow range of ±1° F., within a given time span, thereby meeting all USDA regulations related to time-temperature exposure and consequently guaranteeing bacteriological safety and optimum end product quality attributes.

Thus, the product unit with the least unit weight factor will reach a given internal temperature of, as an example, 150° F., if exposed to a conduction temperature of 150° F. for a time factor of X; where units with greater unit weight factors will ultimately attain the identical internal temperature with a time factor of X +Y, while the smaller product unit is simultaneously maintained i.e., held) at the ultimate temperature during the time span required for larger product units to reach optimum internal temperature as specified in the USDA's mandatory regulations.

No single grilled product unit, however, regardless of its variable individual weight factor, will ever attain a higher equilibrated internal temperature than the conduction temperature to which the full batch is exposed, in the above example 150° F. Bearing in mind the objective of such precise internal temperature control over products varying in their respective unit weights, the time span utilized to equilibrate and hold is therefore dependent on the specific grill surface conduction temperature exposure, and demonstrates the consistent achievement of control over the most critical point of reference of the process and apparatus.

Conventional methods for temporary storage or staging of hamburger patties in high-humidity environments for prolonged time spans does affect the product's optimum yield (i.e., moisture content), tenderness and myosin bond structure, thereby influencing the patties' organoleptic attributes as well as their perceived "bite-feel."

The multi-deck clamshell, low-temperature conduction and radiation, cooking and staging grill of the present invention may be used as a means of thawing precooked, frozen meat patties, cooking fresh-frozen meat patties, or staging for equilibration purposes, with the advantage of fully grilled patties consistently achieving equilibrated internal product temperatures varying between 145° and 165° F., within the narrow, selectable temperature range of ±1° F. The meat product processed thereby retains a significantly higher moisture content than during the high-speed elevation of internal product temperature by conduction through exposure to surface grill temperatures ranging from 350° to 425° F. The multi-deck cooking and staging grill is designed for maintaining internal product temperature equilibration to a final, pathogenically safe temperature, requiring only that the sum total of all products exposed to the equilibration process in the staging grill to achieve a temperature equilibration balance between 1° and 15° F. A maximum temperature elevation of only 10° to 15° F. is needed to raise all individual food articles to the ideal internal temperature when these products have been either fully cooked on an open grill or a clamshell grill at high speeds, for between 90 and 240 seconds, as practiced universally by the industry with high-speed, high-temperature grills.

Based on the above-described critical factors associated with the mass production of grilled ground beef (i.e., hamburger) products, the optimum risk management via the low-temperature clamshell cooking and staging grill technology offers the most precise and efficient heat transfer dynamics capable of consistently guaranteeing the bacteriological (i.e., pathogenic food) safety, color uniformity, moisture retention and highest organoleptic quality attributes in the mass production of this food article, all benefiting the perfection of state-of-the-art technical performance achievements for providing first quality food which is impossible to attain with conventionally known and practiced grilling technologies.

Ground red meats which are neither injected nor marinated with curing agents of any type, such as nitrites, nitrates, salts, phosphates or other formulated curing agents, may be subjected to various internal product temperature elevation procedures resulting in desired doneness levels (i.e., cross-sectional color intensity, from bloody pink to grayish brown), ranging from 130° to 165° F. in temperature exposure. The meats are then held at a selected, precise temperature for various staging time spans in accordance with stringent USDA regulations depending strictly on exposure to their specific temperature factors for desired, uniform cross-sectional color profile development. Contrary to conventional grilling processes, the actual staging (i.e., holding) time factor, at an equilibrating temperature from 150° to 165° F., is therefore irrelevant in determining the cross-sectional meat color profile.

The preferred embodiment of the multi-deck, low-temperature conduction and radiation, high-speed cooking and staging grill comprises at least one and preferably a plurality of horizontally hinged, layered, and interlocking trays forming "decks" in a clamshell arrangement. Each tray, or plate, comprises a first and second sheet, having a serpentine fluid heat transfer passage formed thereinbetween for recirculation of a heat transfer media. The recirculated heat transfer media and the surface of the plates are precision-controlled within the narrow range of ±2° F. at selected "low" temperatures up to 205° F., or higher when temperatures up to 500° F. are desirable. The trays are designed to effect uniform, low-temperature conduction and radiation heat transfer to the center of each patty or other food article. A computerized, electronic control system directs and monitors the process, and records the time and temperature variables, as well as ultimate internal product temperature equilibration, for the multi-deck cooking and staging grill.

The multi-deck cooking and staging grill, in either single-, double- or multi-deck format, will provide equilibrated temperatures for any selected conductive grill surface within the center of each ground beef patty within the precision of ±1° F., irrespective of the position of the patty on the grill plate, or weight, thickness or circumference variables of a wide variety of meet patties. Once a single hamburger (or multitude of patties) is placed in the grill's trays, and clamped between two conductive grill plates from the top and bottom, the equilibration temperature selected to effect thermal kill of trace pathogens will be maintained for a minimum time span, as mandated by federal regulations to be sufficient to kill any pathogenic bacteria, before the tray can be opened and the product served. A computerized electronic process monitoring means signals (both audibly and visually) when a tray of hamburgers is available for dispensing and safe consumption, thereby meeting USDA- and FDA-mandated pathogenic thermal lethality requirements for cooked food articles.

Furthermore, the multi-deck clamshell cooking and staging grill is designed to incorporate interlocking, stacked trays in various shapes and sizes, formed as to depth into a "pan" means, wherein the bottom, deep-drawn "pan tray" is constantly heated by conduction, via the hot, circulating heat transfer fluid, thereby cooking and "holding hot" any food product that is maintained in unit form or in bulk, in an absolutely safe and perfect temperature environment between ±60° and 205° F., depending on the specific ideal, or preferred, temperature of any specified food article. The heated, "deep pan tray" is covered with the bottom of a heated plate, positioned above the heated deep pan tray, thereby forming a "lid" means which can be elevated to offer easy removal of a product from the lower deep pan tray for hot food serving purposes at high speeds, and instant lid closure for maximum uniform heat retention of the stored hot food in the bottom pan.

All vertical, perpendicular and horizontal, fluid-connected vessels will be connectable and disconnectable from the recirculating liquid heat transfer hot media supply via standard, quick-disconnect means, which are available for this application from several manufacturing sources. The same process principle can be practiced in a variety of shapes and apparatus configurations such as double-walled vessels for maintenance of hot soups, coffee, tea, and other foods constituting liquid and solid food substances.

The method and apparatus described herein for the multi-deck, conduction and radiation, clamshell cooking and staging grill and processing procedures have a significant impact on the quality of the cooked, hot food product during prolonged staging, due to the fact that any product subjected to this unique staging (i.e., hot holding) procedure will have a dramatic, time-related quality and food safety elasticity by at least 100 to 300 or more percent longer, due to its higher moisture content retention achieved by the precision equilibrate, internal and external food article temperature control and the environment in which the food is stored, by convective, conductive and radiation equilibration within the narrow range of ±2° F., for hours of safe maintenance, without generating any excessive water vapor (i.e., moisture evacuation) from the hot-held food article of protein or farinaceous composition.

The net result is not only addressing the achievement of bacteriological and pathogenic food safety, but highlighting the retention of the delicate, volatile, "seared" flavor components achieved during the preliminary, high-temperature grilling process, and by avoiding the subjection of previously grilled food products to a high-moisture (i.e., saturated) environment in secondary staging which will, by rapid oxidation, negatively quench and dissipate the delicate aromatic and flavor components and preferred attributes achieved with high-temperature grilling, which are organoleptic quality attributes most desired by the consuming public.

SUMMARY OF THE INVENTION

The present invention comprises a double-, triple- or multi-deck conduction and radiation cooking and staging grill for pathogenic risk management of food articles, constructed of interlocking trays or heat transfer plates spaced apart from one another and formed from at least two sheets of material having heat transfer fluid circulating therethrough. The specially designed heat transfer plate configuration may utilize metal sheets which are seam- and spot-welded, and high-pressure, pillow inflation-expanded, with one side flat and with the second side slightly pillow-expanded, which is the preferred method for utilizing stainless steel sheets, or the roll-bonded, pillow- or serpentine-expanded aluminum sheets providing two substantially flat surfaces with liquid heat transfer media passages. The liquid heat transfer fluid channel is expanded and designed to allow a maximum liquid heat transfer media flow rate, evenly distributed through the entire surface of the plate, achieving by their recirculating liquid transfer channels the maximum uniform and equilibrated heat transfer across the entire plate grill surface within the narrow range of ±1° F.

The trays or heat exchange plates of the single deck or multi-deck units are hingeably engagable or disengagable from contact with each other and the thermalized hot-held product by specifically designed spacer configurations aligned for nesting or hingably connecting each of the plates to the housing frame. Mechanical hinging means such as removably secured horizontal plates are disengaged in parallel, or the plates are pivotally moveable into vertical position relative to each other by lever hinges attached to at least one end of the heat exchange plates and the frame. The hinge means enables the fluid-connected heat exchange plates to be perpendicularly opened and maintained in tandem in vertical position, and realigned in precise horizontal condition relative to each other. The hinging arrangement and locking mechanism provides maximum conductive heat transfer to the "clamped" food articles, from the top side as well as from the bottom side of the grill plates, achieving the most efficient heat transfer of Btu's by conduction and partial radiation to the respective food article, namely the hamburger or chicken patty or any food article designed to be efficiently thermalized within the space allocation between two or more heat transfer thermalization plates.

The grill plates in their horizontal, thermalization position are slightly slanted toward the back side of the apparatus, so as to cause excess fat drainage from the hot-held hamburger patties to a fat (i.e., excess grease) retention container provided for that purpose which can be timely removed and the trapped grease can then be discarded for ultimate disposal. The lower side of the grill plate may be provided with round or rectangular protrusions of 3/16" to 1/4" depth for penetrating into the hamburger patties to secure the patties in vertical cooking or staging position, thus preventing movement of the patties when two engaged grill plates are angularly raised to vertical position for access to a bottom plate containing a volume of cooked and hot-held hamburger patties for immediate sale to respective customers. Further, selected expanded protrusions projecting from the grill plate are provided with a desired raised insignia or corporate logo for the purpose of indentation into a hamburger patty by the weight of the upper plate for marketing or promotional opportunities.

A low-temperature, liquid heat transfer medium is continuously recirculated via a low-pressure, magnetic centrifugal pump. The lower temperature heat transfer fluid is supplied from a small reservoir equipped with submerged electrical heater means ranging between 1.5 and 5 kwh (or higher, if called for), and controlled by electronic, proportionate thermocouple-sensitive, energy input activating and deactivating means, with milliseconds energy input response. The liquid heat transfer medium is controlled at a precise temperature selected to effect the grill plate surface temperature within the narrow range of ±1° F. The low-temperature cooking and staging grill is designed to operate below the boiling point of 212° F., and therefore does not require any atmospheric, pressure-release venting means.

The low-temperature equilibration cooking grill and staging apparatus does not cause any excessive water vapor pressure in the food product (i.e., hamburger patty), and maintains food articles at a bacteriologically safe temperature without any moisture loss or degradation of the food articles, resulting in perfect quality for prolonged time spans exceeding 30 to 40 minutes.

Conventional grills and fryers, operating at temperatures above 212° F. (i.e., the boiling point of water), and many times extending from 325° F. up into the 425° F. to 500° F. range, are required by law to be equipped with automatic fire extinguishers, and ventilation hoods provided with means for filtration of emitted grease vapor fumes. The low-temperature cooking and staging grill of the present invention generates no objectionable or volatile food odors or grease vapors, and can therefore be operated in any commercial environment without requiring venting and/or fire extinguishing means, such as an ancill system, thus, presenting no objectionable Environmental Protection Agency compliance mandates for public establishments and a cost savings associated with the incorporation, installation, maintenance and operation of exhaust equipment. Futhermore, the elimination of venting and fire extinguishing means is an important consideration in the portability of the stand-alone cooking and staging grill.

Precooked hamburger patties can be efficiently rethermalized from frozen state and held until sales demand occurs, for prolonged or instant availability. The double-, triple- or quadruple-staggered design of the grill plates can be designed to meet any required production schedule cycle, strictly depending on projected product sales per hour. The low-temperature cooking and staging grill is user-friendly, non-intimidating and perfectly safe for the operator; therefore, no burn hazards or related injuries are associated with operation of the apparatus or practice of the thermalization process.

Electronic safety control means are provided so as to interlock the respective individual plates for a specific, selected operational sequence time. A computerized instrument panel monitors and controls the process of the grill and maintains and digitally displays precise product temperature processing records. Electronic means are mounted on suitable areas of the plate designed to assure the time-temperature maintenance of a volume of hamburger patties for a predetermined time at a specific conduction temperature required to achieve the critical thermal lethality curve for any pathogenic residuals in the patty. The electronic safety control means are so designed as to interlock two respective plates for a specific, predetermined time, and will only release the movement of the plates once sufficient staging time has elapsed, thereby assuring the pathogenic risk management, time-temperature equilibration repetitively guaranteeing the food article's safety, in compliance with USDA-mandated thermalization procedures. Provisions are also incorporated which will sound an alarm should a plate be manually disengaged by an operator prior to the minimum safe time maintenance (i.e., "safety dwell time") for completion of the equilibration cycle as specifically required for product temperature equilibration during prolonged staging.

Thus, the clamshell cook and staging grill of the present invention provides a means for transferring heat to food articles utilizing an apparatus comprising a housing frame having a deck therein including at least one pair of stacked plates comprising a first plate and a second plate spaced apart and in alignment, each plate comprising a first sheet and a second sheet of heat transfer material bonded together having fluid heat transfer passages thereinbetween for recirculation of a heat transfer fluid wherein the plates are mounted to the housing. The apparatus further includes means for connectively mounting the plates to the housing, a reservoir within the housing for containing a heat transfer fluid, means for fluid-connecting the plates and the reservoir, means for heating the heat transfer fluid to a selected temperature in the reservoir, means for controlling the temperature of the heat transfer fluid within the reservoir at ±2° F., means for recirculating the heat transfer fluid through the plates in fluid-connection with the reservoir and each of the heat transfer plates, and temperature sensing means for determining the temperature of at least one of the food articles supported on the plate.

The present invention provides a method of pathogenic risk management utilizing a clamshell grill cooking and staging process for transferring heat to food articles comprising the steps of placing a food article to be heated between a first plate and a second plate hingeably mounted to a frame of a cooking and staging grill, heating the heat transfer fluid to a selected temperature in the reservoir, fluid-connecting the plates and the reservoir, controlling the temperature of the heat transfer fluid within the reservoir at ±2° F., recirculating the heat transfer fluid through the plates in fluid-connection with the reservoir and each of the heat transfer plates and sensing the temperature of the heating fluid and the food article for controlling the temperature thereof.

It is an object of the present invention to provide an apparatus and process having the ability to thaw, cook and hold a variety of prepared foods at optimum, pathogenically safe temperatures, for extended periods of time, without loss of quality and, most importantly, advancing the most critical aspect of pathogenic food safety for the mass feeding industries.

It is an object of the present invention to provide a system for continuously circulating heated fluid through passage-expanded metal shelves, providing even thermalization temperatures over the respective plate surface within the narrow range of ±1° F., therefore eliminating any hot or cold spots across the entire surface of the grill plate.

It is an object of the present invention to provide a hot-held inventory (i.e., a "bank") of food products to be held for instant serving, in the safest condition and at the highest possible organoleptic quality level.

It is an object of the present invention to provide visual gauges, backed by audible and digitally illuminated, electronic sensing controls for safeguarding the product and monitoring the process.

It is an object to provide actual anklet temperature indicators easily viewed on digital electronic displays.

It is an object to provide solid-state microprocessors which maintain tight and consistent temperature monitoring and narrow-range calibration.

It is an object to provide an apparatus designed and constructed to meet stringent safety and sanitation requirements for UL, CSA and NSF approval.

It is an object of the present invention to provide a multi-deck clamshell cook and staging grill that does not require venting, and is implementable in any kiosk or commercial food service operation.

It is an object of the present invention to provide a multi-deck clamshell cook and staging grill which is portable.

It is an object of the present invention to provide a staging process for pathogenic risk management suitable for products thermalized by grilling and/or frying processes, and then held for staging; or for the rethermalization of pre-cooked, frozen products to be dispensed without further treatment.

It is an object to provide an apparatus and thermalization process to manage the pathogenic risks associated with the deadly pathogen *Escherichia coli* 0157:H7. and and achieve thermal lethality thereof.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 11 is a top view of one of an inked sheet showing dark shaded no-weld inked surfaces and the light to-be-welded surface areas of a typical roll bonded panel;

FIG. 12 is a top view showing the heat transfer fluid conduits between the welds of the roll bonded embodiment of the present invention;

FIG. 13 is a cross-sectional view of a plate along lines 13—13 showing the heat transfer fluid conduits of the double sheet roll bonded panel forming a tray of the present invention;

FIG. 14 is an enlarged view of FIG. 13.

FIG. 21 is a perspective view of an inflated one side plate having a single embossed surface.

FIG. 22 is an enlarged front plan view of the single embossed surface plate shown in FIGS. 22.

FIG. 23 is a perspective view of an inflated both sides plate having a double embossed surface.

FIG. 24 is an enlarged front plan view of the inflated doubled embossed surface plate of FIG. 23.

FIG. 25 is a deep well tray formed from a resistant welded plate.

SPECIFICATION

Figure 1:
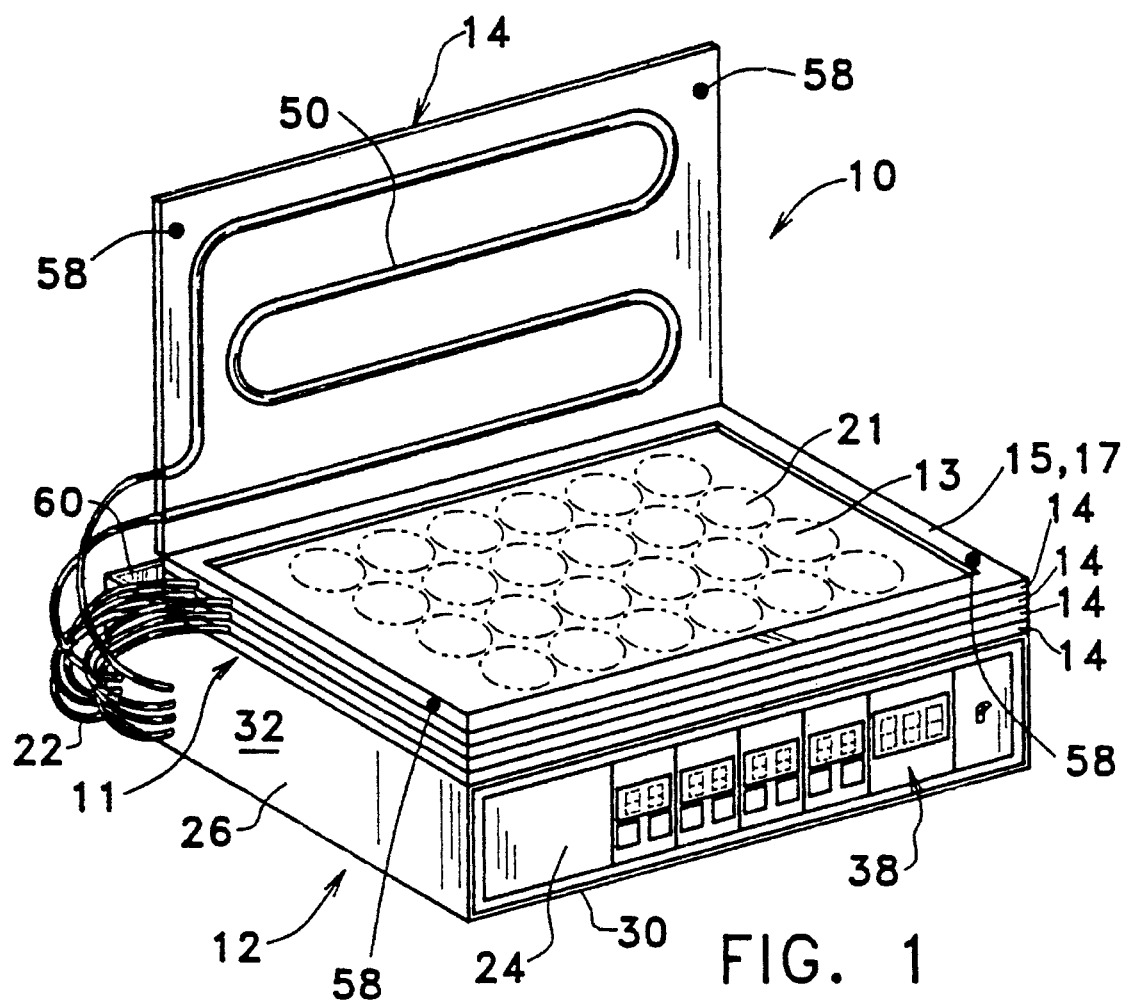
FIG. 1 is a perspective view of showing the multi-deck cook and staging grill for pathogenic risk management of the present invention having one of the stacked interlocking trays being open having a heat transfer conduit shown on the bottom thereof and meat patties being shown in phantom lines on the top of the adjacent tray.

As illustrated in FIGS. 1–16, the present multi-deck clamshell cook and staging grill 10 for pathogenic risk management comprises a housing frame 12 supporting a deck 11 of integral heat transfer and support plate means 14 hingably mounted, swivelly connected, or disengagably connected thereto. The deck 11 includes a pair of integral heat transfer and support plate means 14 of the preferred embodiment defining at least one upper and lower tray or plate 14 for hingably mounting to the housing frame 12 for supporting and heating food articles 13. Each plate 14 is supported independently by the housing frame 12 and mounted one on top of the other in a clamshell arrangement. The low-temperature cook and staging grill 10 is designated to operate below the bailing point of 212° F., and therefore does not require any atmospheric venting means nor sealing means between the trays or plates 14 when utilized as a cook and staging grill 10. For cook and staging grill 10 applications, the low-temperature equilibration grill 10 does not cause any excessive vapor pressure in the product, i.e. hamburger patty, and maintains the food articles 13 at a bacteriologically safe temperature without any moisture loss or degradation of the food. However, the plates 14 in the preferred embodiment are spaced apart from one another and supported by a nonsealing frame 15 surrounding the periphery of the plate 14 in order to contain food articles 13 therein between each plate 14 and control the drainage of liquids formed in the heating process, wherein the food articles 13 are contiguous with the bottom surface of a top plate 14 and the top surface of a bottom plate 14. A sealing frame 17 having a sealing means such as a polymer gasket means may be provided as an air and water tight seal between the plates 14, as shown in FIG. 2, for high temperature cooking applications above 212° F. in combination with and prior to the staging operations, or for preventing oxidation of the product due to exposure to the air. Moreover, the top plate 14 may be coated with an insulating material to the top surface to insulate the lower plates 14 from ambient temperature conditions and to insulate the user from the heated plates 14 of the deck 11.

Figure 2:
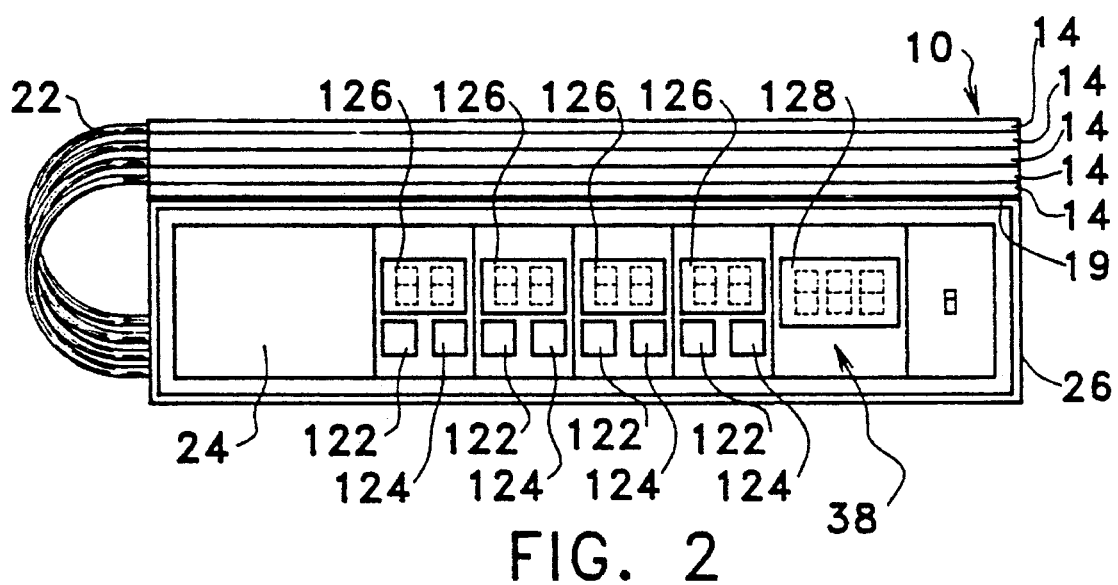
FIG. 2 is a front view of the multi-deck cook and staging grill of FIG.1 showing the trays in the closed position.
Figure 3:
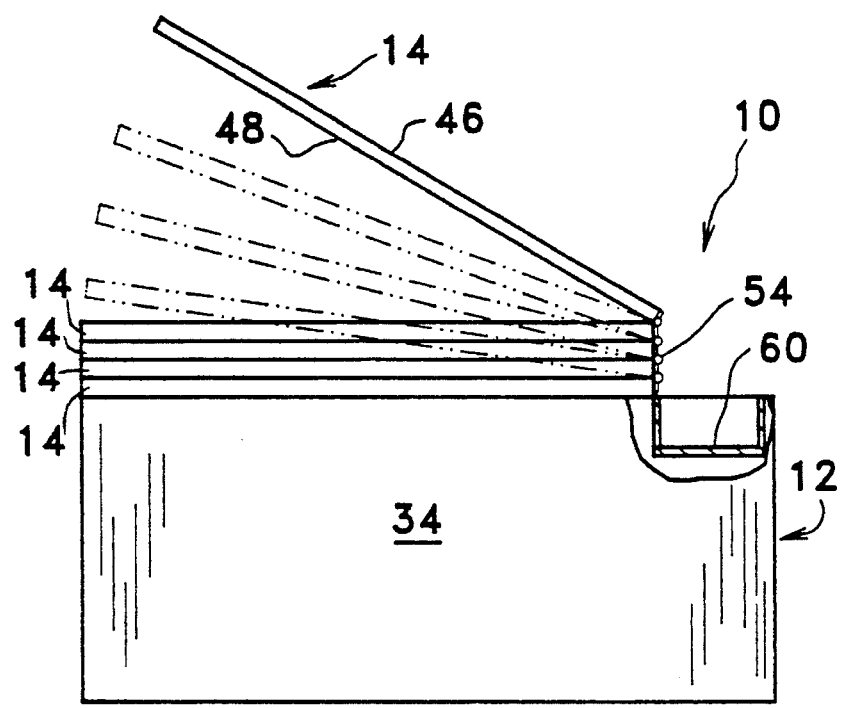
FIG. 3 is a side view of the multi-deck cook and staging grill of FIG.1 showing several plates being closed with the top plate in the open position.
Figure 7:
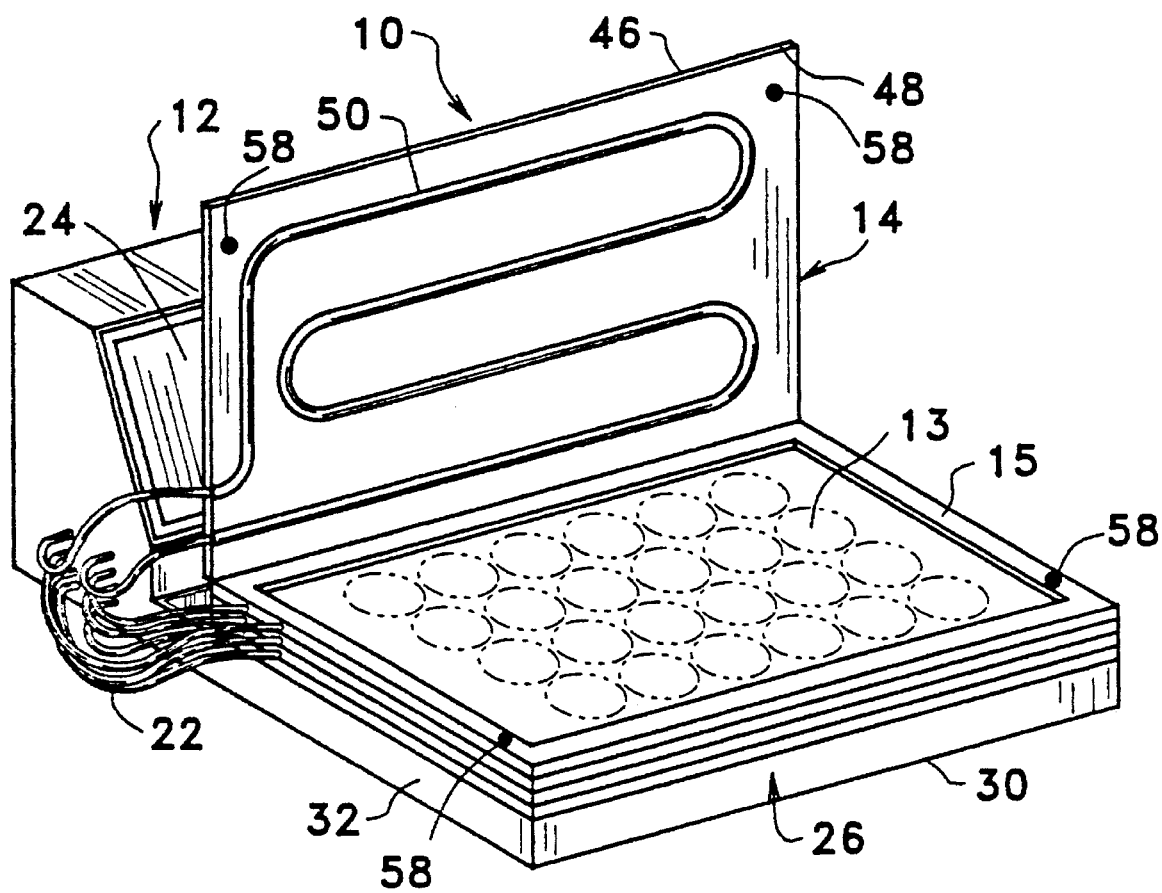
FIG. 7 is a perspective view of showing an alternate embodiment of FIG.1 with one of the stacked interlocking trays being open, and showing a heat transfer conduit and meat patties in phantom lines, wherein the control panel is mounted upon the rear portion of the base of the multi-deck cook and staging grill rather than located in the front portion of the base as shown in the embodiment of FIG. 1.
Figure 8:
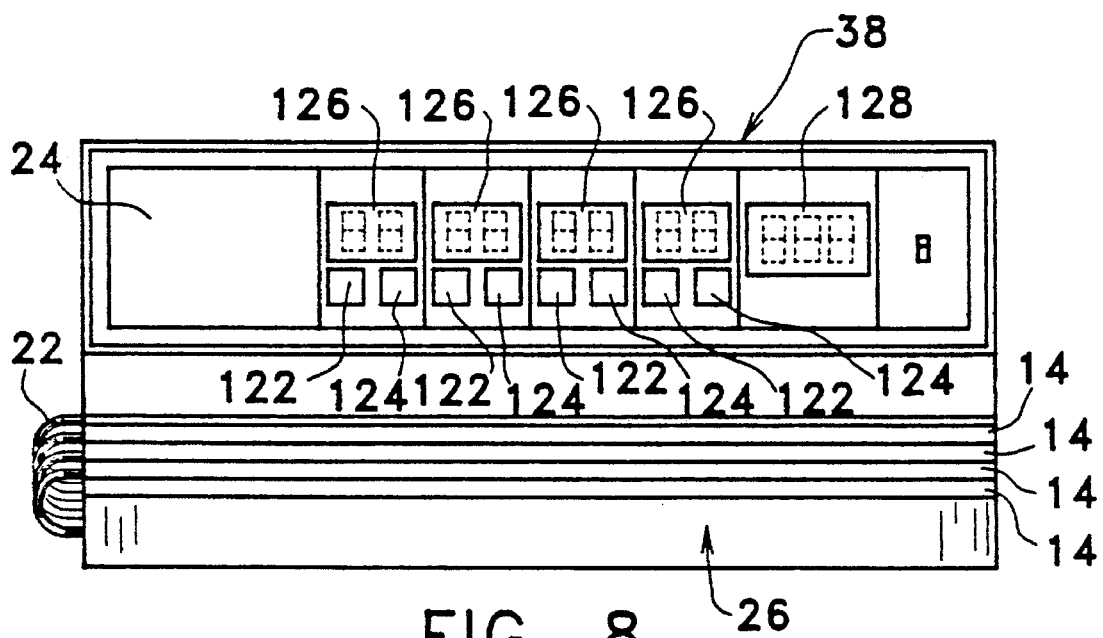
FIG. 8 is a front view of the multi-deck cook and staging grill of FIG. 7 showing the trays in the closed position.

More particularly as shown in FIGS. 1, 2, and 3, the housing 12 of the preferred embodiment of the clamshell grill 10 comprises a deck 11 of plates 14 supported by a base 26 having a bottom floor 28 (not shown), a front side wall 30, a left side wall 32, a right side wall 34, and a rear side wall 36. An instrument control panel 38 is formed integrally with or attached to the front of the base 26 as shown in FIG. 1 or mounted onto a portion of the housing 12 extending above the base 26 such as is shown in FIG. 7.

Figure 4:
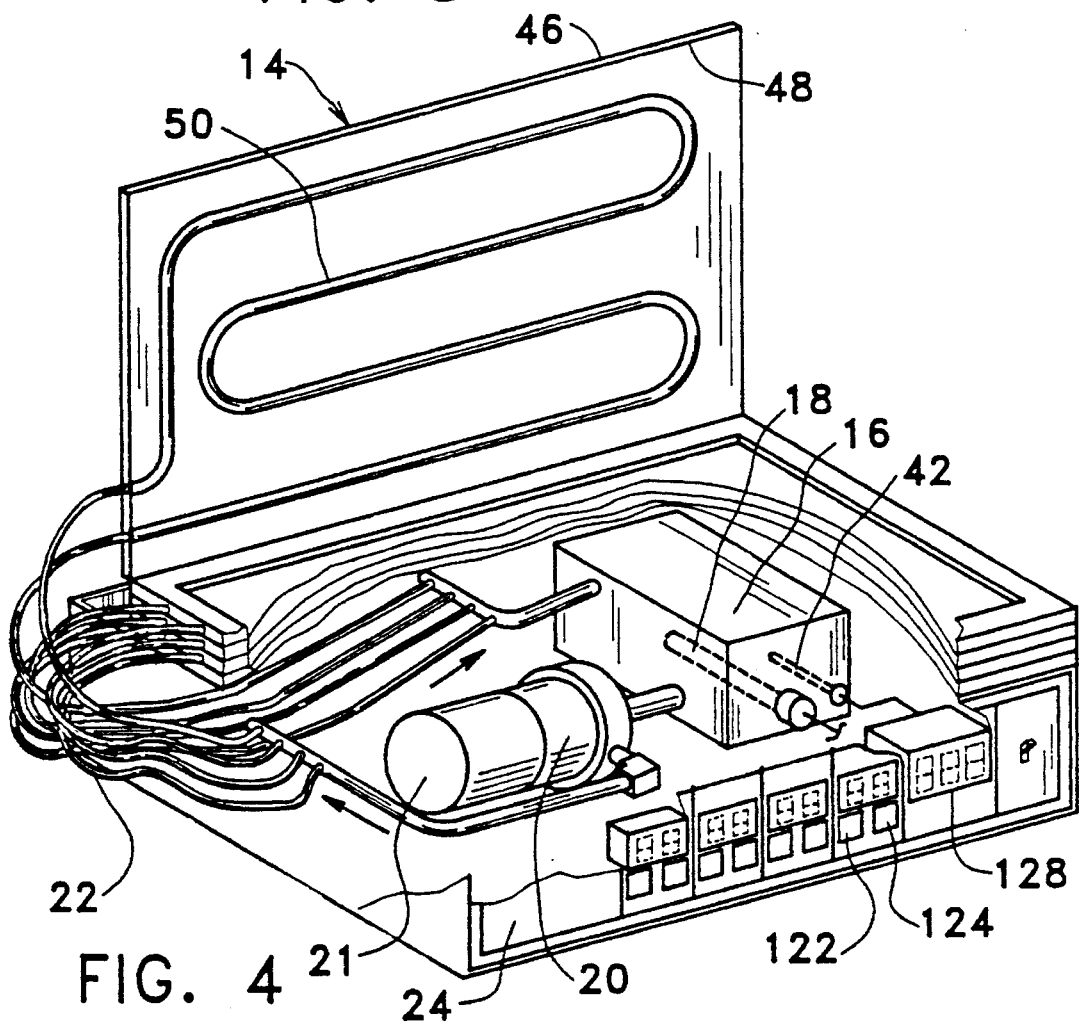
FIG. 4 is a cut-away perspective view of the multi-deck cook and staging grill of FIG. 1, showing some of the components within the housing.
Figure 6:
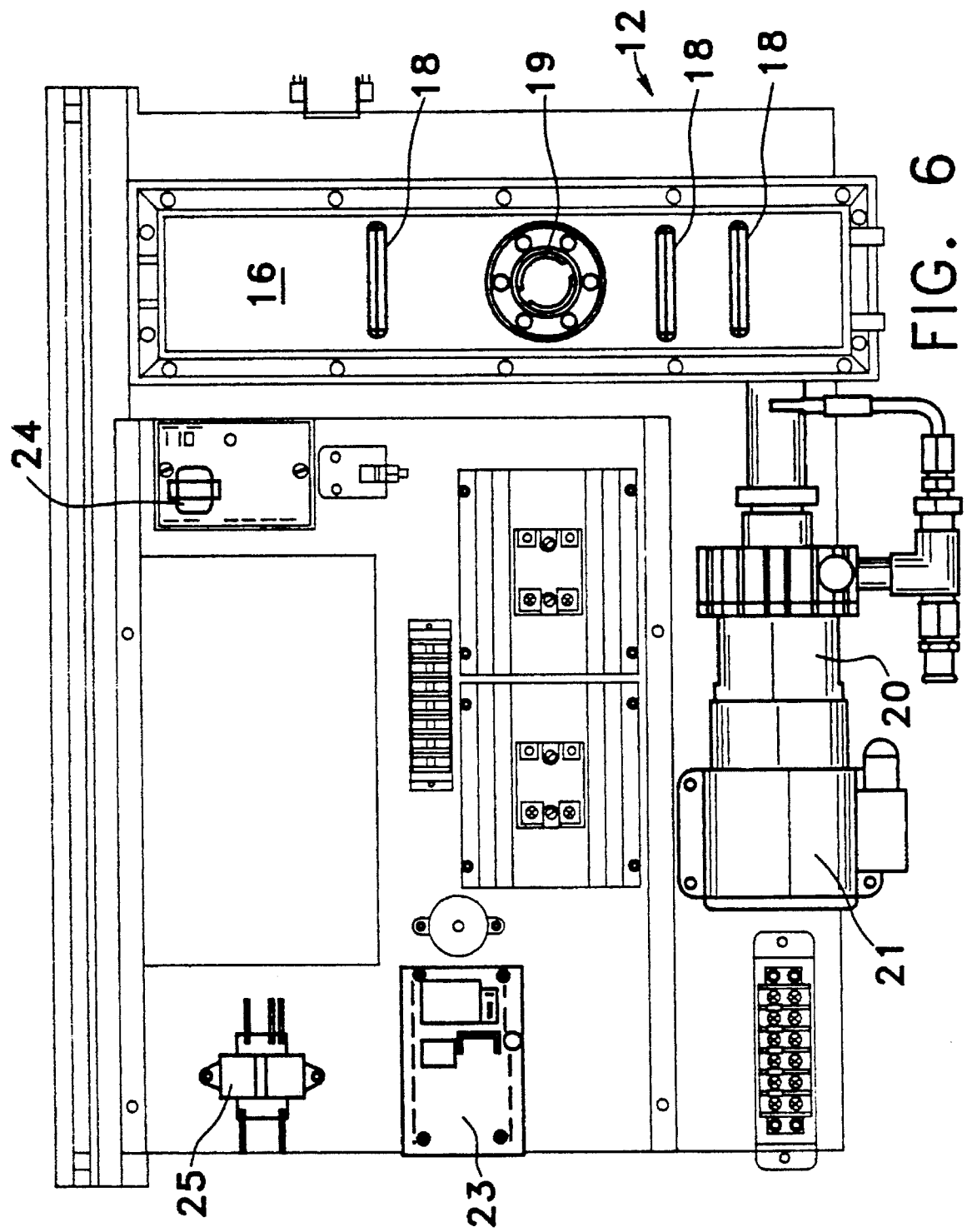
FIG. 6 is a top view of an embodiment of the present invention showing an arrangement of the pump, reservoir, and heating elements therein.

As best shown in FIGS. 4 and 6, the housing contains a reservoir means 16 containing a liquid heat transfer medium. The sump reservoir 16 is designed to receive a volume of liquid heat transfer medium, such as water, or other nontoxic heat transfer liquid. The heat transfer liquid filled through removable cap 19 is continuously circulated between two or more vertically staggered manifold connecting conduit means in a volume sufficient to permit the elevation and maintenance of specific, equilibrated surface temperatures across the plate 14 via the temperature-controlled, low-pressure recirculating heat exchange fluid. The reservoir 16 is fluid-connected to a pump means 20, more particularly a low-pressure magnetic centrifugal pump 20 driven by an electric motor 21 for circulating a low temperature heat transfer fluid, such as water, oil, or food grade glycol, through the trays 14 which are in fluid communication with the pump 20 and reservoir 16 through conduit means 22.

The low temperature heat transfer fluid supplied from the reservoir 16 is heated by a heating means 18 comprising one or more submerged electric heating elements 18 of sufficient voltage ranging between 1.5 kwh and 5 kwh and controlled by electronic proportionate thermocouple-sensitive means to effect a heat surface density to efficiently transfer BTU's from the heat source to the liquid heat transfer medium continuously recirculating through the motor-driven, centrifugal magnetic pump 20. A heating overload safety device 23 is incorporated to maintain the heat transfer fluid at a safe operating pressure and temperature. Furthermore, a fan 25 is provided to cool the circulation and process control equipment.

An electronic, proportionate impulse temperature controller 44, (not shown), is electronically connected to the submerged electric heater means 18 and submerged in the sump reservoir 16 to effect the elevation and maintenance of the heat transfer medium's temperature by energizing the heater at required frequencies, thereby achieving precise control (within the narrow range of ±1° F.) over the heat transfer fluid's temperature. In addition, electrical overrun safety means are connected to the electric heater in such manner as to effect safe, instant deactivation of the heater 18, in case a malfunction of the proportionate temperature controller 42 should for any reason occur.

The heat transfer medium is controlled at a precise temperature selected to effect the grill plate 14 surface temperature. The sump reservoir 16 is also equipped with electronic means, comprising at least one controller and at least one thermocouple 42 designed to alternately activate and deactivate the electric heater 18 at frequencies required to effect the maintenance of specific temperatures, within the narrow range of ±1° F., in the recirculating heat transfer fluid, thereby guaranteeing precise surface temperature control across the entire plate 14. The heat transfer fluid maintains a constant temperature across the surface of each plate 14 connected to the circulation system, within the narrow range of ±2° F. between the heat exchange fluid entrance and exit ports of the reservoir 16.

The heating and recirculating system supplies the plates 14 of the multi-deck grill 10 with recirculating heat transfer medium, with BTU input sufficient to maintain a selected temperature ranging from room temperature at about 50° F. to about 80° F. to an optional operating temperature of up to 205° F. Emphasis is directed toward the fact that the fluid-connected, recirculating assembly is configured, in its totality, as a closed loop system. The liquid-containing sump reservoir 16 is equipped with a pressure release valve 40 (not shown), or other similar means, in order to allow the closed loop configuration to operate within one to two atmospheres between the reservoir 16 and system pressures. The volume of heat transfer fluid is maintained at a constant pressure and velocity throughout the heat transfer system and control of the temperature of the heat transfer fluid is effected by a microsecond controller connected to the electrical heater means 18 and thermocouple-sensitive means 42 to obtain the most accurate control and quickest response time in order to achieve and maintain the desired temperature of the fluid and plates 14. It is contemplated that the fluid flow rate parameter could be controlled to control the temperature of the fluid as well; however, the process control is more complicated, expensive, and usually less accurate, than by simply controlling the heater means 18.

The double, triple or multi-deck cook and staging grill 10 for pathogenic risk management is constructed of interlocking trays or heat transfer plates 14 formed from at least two sheets of material having heat transfer fluid circulating therethrough. In the preferred embodiment, the integral heat transfer and support means 14 of the multi-deck cook and staging grill 10 comprises at least one and preferably a plurality of horizontal layered interlocking trays or plates 14 spaced apart from one another in a clamshell arrangement. Each plate 14 consists of a first top sheet 46 and a second bottom sheet 48 of heat transfer conducting material sealingly connected together having at least one fluid channel 50 therebetween, such as a conduit or cavity in fluid communication with the reservoir 16 through conduit means such as the hollow tubing 22. Each sheet 46, 48 provides a heat transfer surface for conductioin and radiant heat to the food articles disposed thereon or thereinbetween. The heat transfer fluid and surface of the individual plates 14 are controlled at a selected "low" temperature. The trays 14 are designed to effect rapid and uniform low temperature heat transfer to the center of each hamburger patty 13.

The trays or plates 14 are hingeably engageble or disengagable from contact with each other. In the preferred embodiment, the plates 14 supporting the thermalized hot-held product are mounted by mechanical hinging means 54 which engage and disengage the horizontal plates 14. More particularly, lever hinges 54 attach to at least one end of the each of the plates 14, or plate holding frames 15, 17 and the rear wall 36 of the housing 12 as shown in FIG. 3. The hinge means 54 enables the plates 14 to be perpendicularly opened and realigned in precise horizontal condition relative to each other. The hinging arrangement provides maximum heat transfer from the plates 14 to the food articles via conduction and radiation heat transfer from the bottom of the first top sheet 46 as well as from the top of the bottom sheet 48 of the grill plates 14. Moreover, convective currents formed by moisture present in the vapors and juices existing in and around the interstices of the food product also serves to enhance the heat transfer of BTU's in combination with the conduction and radiant heat imparted to the food articles from the plates by conduction to the respective food article and convection of moisture formed by juices within the food article. Typically the food articles are meat products such as hamburger, turkey, pork, or chicken meat patties or any other viable food articles 13 including vegetables, carbohydrates, and farinaceous products. A spring means 56, such as a torsion spring may be utilized to bias each plate 14 in the open "up" position. The locking latch or fastening means 58 (not shown) may be utilized to removably secure each of the plates 14 to the base 26 or one another in the open "up" position or in the closed "down" position during the heating cycle. The latches 58 are in electrical communication with the control and alarm system 24 and controlled with a Watlow Process Controller and Digital Monitor or equivalent computerized controller and alarm system 24.

The grill plate 14 can be configured to permit a variety of loading depths (i.e., the distance between the underside of the upper grill plate 14 and the top surface of the lower grill plate 14. When operational needs call for a horizontally oriented closing function, the use of specially designed, floating hinges girdling the entire periphery of the plate and its raised side walls, (not shown) allow the plate 14 to be lifted from its closed position by ⅛" up to 4", in the basic configuration, or even higher when specific purposes necessitate a greater loading depth. This flexibility in dimensional heights, achieved through various, operationally specific design modifications, allows for accommodations to meet the most efficient conductive thermalization (i.e., heat transfer) dynamic as related to the average cross-sectional dimensions of any specific food product unit.

The multi-deck clamshell grill's 10 offers an additional novel benefit during product thermalization and staging processes. By raising any or all of the grill's trays 14 from horizontal (i.e., conductive thermalizing) position to a vertically angled, conductive thermalizing position between from the horizontal plane at about 0 degrees to about 65 degrees, the excess evacuation of oils and fats extracted from the cooked food articles, toward the rear of the grill plate 14, is effected. A specially designed receptacle basin or fat retention container 60 is fitted to the rear of each plate to permit accumulation of these drippings, and can easily be removed from the housing 12 for periodic disposal of said fats and oils.

Moreover, in the preferred embodiment, the grill plates 14 are slanted slightly with respect to the horizontal plane to cause excess fat drainage from the hot-held hamburger patties or other food articles 13 to the fat retention container 60 provided for that purpose for ultimate disposal. It should be noted and is hereby emphasized that all excess fat and oil fluids, extracted during the conductive and convective thermalization and staging processes, do not constitute any volatile fat particles capable of leading to environmental pollution, since said oil and fat extraction, as well as their subsequent evacuation, occur at temperatures never higher than 205° F. and, therefore, always well below the boiling point of water. Engineering the multiplicity of grill plates 14 within the clamshell grill 10 so as to permit them, in their closed, horizontal orientation, to be tilted backward at an angle sufficient to cause all evacuated oil fluids to flow toward the rear receptacle basin for intermittent accumulation and disposal has distinct organoleptic effects upon previously grilled or fried food articles 13 via the evacuation of additional percentages of the fat residues remaining in precooked and staged products. Consequently, the end product is lower in overall fat content (and, hence, more desirable to most consumers) than one not subjected to this unique staging process.

Figure 5:
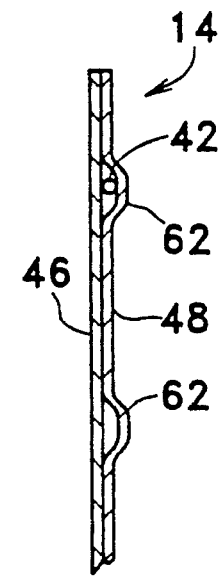
FIG. 5 is a side view of one of the plates of the multi-deck cook and staging grill.
Figure 9:
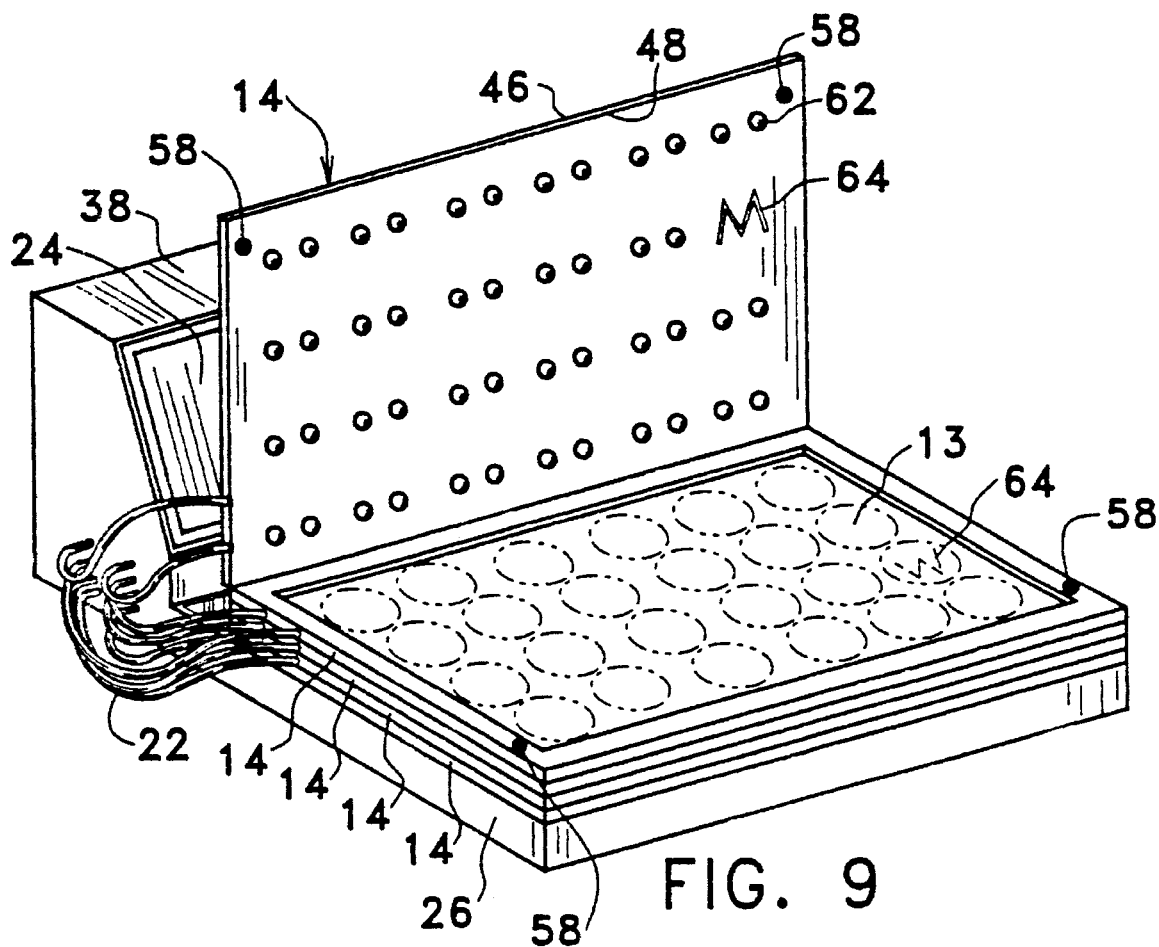
FIG. 9 is a perspective view of the multi-deck cook and staging grill of FIG. 7 showing the top plate in the open position and having protuberances extending from the bottom thereof.
Figure 10:
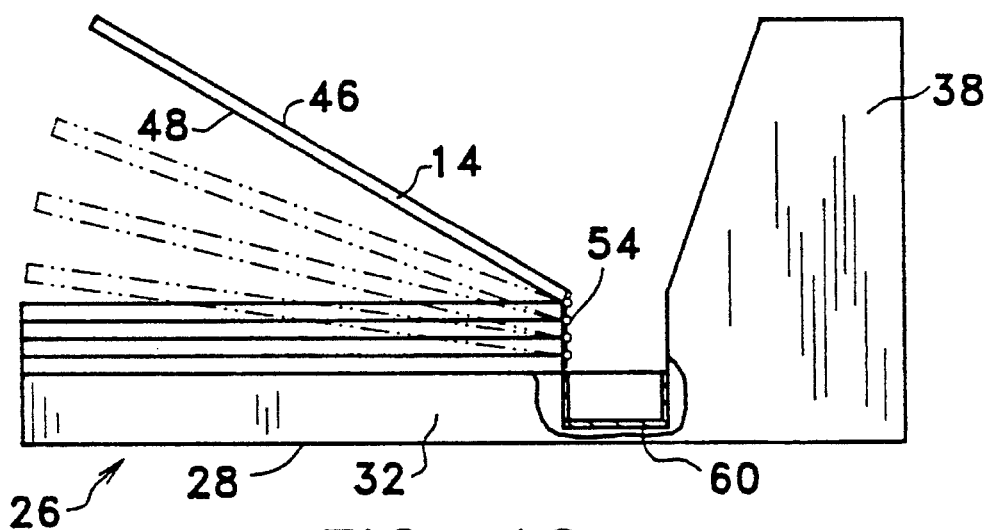
FIG. 10 is a side view of the multi-deck cook and staging grill of FIG. 7 showing several plates being closed with the top plate in the open position.

As illustrated in FIGS. 5 and 9, the second bottom sheet 48 of the plate 14 may be formed having a multitude of inflated round or rectangular protrusions 62 of 3/16" to ¼" in depth for penetrating into the upper or lower surface of the hamburger patties 13 at designated points, thereby securing the patties 13 in position on the plate 14. This prevents movement of the patties 13 when two engaged grill plates 14 are angularly raised for access to a bottom plate 14 containing a volume of cooked and hot-held hamburger patties 13 for immediate sale to respective customers. Even when both clamshell grill plates 14 are raised from a horizontal orientation to any angle between about i degree and about 60 degrees the patties 13 will remain in position. This novel feature of positional maintenance for food articles placed on a grill plate 14 surface, which surface subsequently undergoes movement ranging from horizontal through a 60 degree angular rise. Moreover, the grill apparatus 10 supplies continuous conduction thermalization to both sides of the food article, while simultaneously maintaining its position relative to the grill plate's 14 plane. Furthermore, the selected protrusions 62 may be formed extending outwardly from the bottom second sheet of the plate 14 with a desired insignia or corporate logo 64 for indentation into a hamburger patty 13 by the weight or spring biasing of the plate 14 as shown in FIG. 9.

The ultra thin high heat transfer trays or plates 14 forming the deck 11 of the multi-deck clamshell cook and staging grill 10 may be formed as integral heat transfer and support means by several manufacturing techniques such as by roll-bonding sheets of metal at high-pressure and pillow-expanding the sheets to form a heat exchange plate 14; seam-welding and "weld dotting" (i.e., spot-welded) two sheets of metal forming a high pressure plate 14; and a third new and novel approach utilizing the aluminum roll bonding or stainless steel seam welding concept maybe deployed to achieve the identical, "pillowed" expansion format having deep cavities.

Preparation of the roll bonded plates 14 requires: taking two sheets of precision aluminum; cleaning and decreasing the sheets; printing a pattern for the fluid-flow tube circuit on one side of one sheet by silk screening; preheating both sheets; metallurgically bonding the two sheets together in a roll mill forming a panel therefrom; annealing the bonded sheets; inflating the fluid-flow channels to specification height by using high pressure air which expands the silk screened areas between the sheets; blanking the panel; and attaching connector tubes to the expanded roll bonding such as by flame brazing.

More particularly, the roll bonded panel or plate 14 comprises a first sheet 46 and a second sheet 48 of aluminum stock of either the same or dissimilar gauge (i.e., thickness). The first sheet 46 is prepared by silk screening the desired circuit on the sheet using a "no-weld" ink 66 such as a graphite coating, reflecting a specific fluid path pattern design. The "no-weld" ink 66 is applied to selected portions of a first blank sheet 46 of thermally conductive aluminum stock having a first sheet top surface 68, a first sheet bottom surface 70 (shown in FIG. 11), a first end 72, opposing sides 74, and a second end 76. The first sheet 46 generally has a thickness of about 60/1,000 to about 65/1,000 of an inch and are compressed during the roll bonding process to have a finished product having a wall thickness in the range of about 0.020 to about 0.030 of an inch thick.

The no-weld graphite ink 66 is applied to the no-weld areas 78 of the first sheet top surface 68 of the first thermally conductive sheet 46 to form a parameter inked weld-line drawn around the edge of the no-weld area 78 of the first sheet 46 leaving a small connector opening 82 at each corner. Application of the no-weld graphite ink 66 to selected interior portions of the first sheet 46 forms a pair of non-inked interior weld lines 84 drawn spaced apart equal distance from one another to create a serpentine shaped heat transfer liquid circuit pattern 86 outlined on the top surface 68 of the first sheet 46.

A second thermally conductive companion blank sheet 48 (not shown) of the same size and thickness as the first sheet 46, having a second sheet top surface 68, a second sheet bottom surface 70, a first end 72, opposing sides 74, a second end 76, and a thickness of about 60/1,000 to about 65/1,000 of an inch is aligned with the first sheet 46 and the second sheet bottom surface 70 is placed in contact with the inked top surface 68 of first sheet 46. The inked no-weld surface areas 78 of inked sheet 46 placed together with the un-inked sheet 48 forms a double sheet panel 88 as shown in Figure 12 having a serpentine shaped circuit pattern 86. The non-inked lines 84 are welded together; however, the no-weld graphite ink 66 separates the top surface 68 of sheet 46 from the bottom surface 70 of sheet 48 in the no-weld areas. Almost any continuous pattern could be inked providing channels or cavities for a particular application.

The panel 88 is heated to approximately 600° F., and moved through a rolling mill under high pressure, typically one to ten tons pressure per square inch gauge, such as described in U.S. Pat. No. 2,690,002 by Grenell, hereby incorporated by reference. The high pressure roll bonding process reduces the thickness of the panel 88 by approximately 60% so that each sheet 46 and 48 is about 0.020 and 0.080 of an inch thick and preferably about 0.025 of an inch thick. The roll bonding process hermetically bonds the non-ink-coated weld line surface areas 84 of the panel 88 together forming a welded double sheet roll bonded panel 89 having interior weld joints 90, end perimeter weld joints 92, and side perimeter weld joints 94.

The roll bonded panel 89 is then placed between a pair of platens and connected to a pressurized gas supply means via the connector opening 82. Upon completion of this high-impact bonding process, the solidly bonded, double-thick plate 14 is pierced, at an appropriately designated position, directly into the non-bonded graphite pattern, and the pillow pattern is then expanded (inflated between platens) with a high pressure gas such as nitrogen or air to a predetermined amount forming conduits 98 conduits 100 between the welds 90–94 forming a roll bonded heat transfer circuit or plate 14 and creating a precisely engineered path of heat transfer fluid travel across the entire heat exchange plate 14 which also serves to support the food articles thereon.

Roll bonding aluminum sheets 46, 48 provides substantially flat top and bottom surfaces on the first and second sheets 46, 48. The liquid heating fluid channels 50 are designed to allow maximum liquid heat transfer evenly distributed through the entire surface of the plate, achieving by their liquid transfer channels 50 the maximum uniform heat transfer on the entire plate 14 surface within the narrow range of ±1° F.

Figure 15:
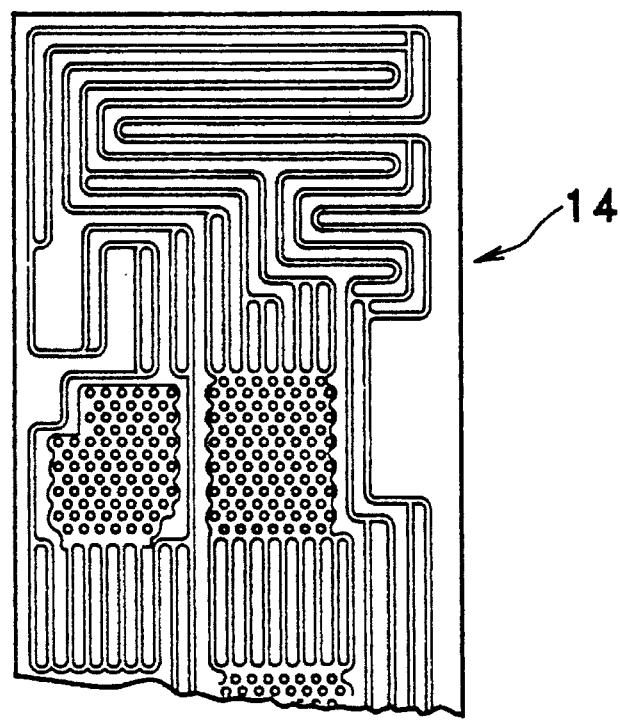
FIG. 15 is a top view of a roll bonded panel showing a circuit formed having a plurality of conduits and dimples formed therein.

FIGS. 13 and 14 show a cross-sectional view of an embodiment of a roll bonded plate 14. As shown in the enlarged cross sectional views of FIG. 14, the top sheet 46 can be formed having a smooth surface or having creases 96 therein at the point of the welds 90–94 for draining excess juices into the fat retention container 60. FIG. 15 shows a roll bonded panel having a plurality of conduits and dimples formed therein to control the flow of the fluid therethrough.

A continuous process for roll bonding aluminum is set forth in Alcan Aluminum's, Algood Aluminum Subsidiary Engineering Information Bulletin, Algoods Roll-Bond engineering Guideline Bulletin, and Society of Automotive Engineers, Inc., ("SAE")'s Bulletin No. 830023 the disclosures of which are incorporated herein by reference.

Mueller's Temp Plate® Bulletin, the disclosure of which is incorporated herein by reference, is fabricated by resistance seam-welding, resistance spot-welding, and arc welding techniques by taking two thin metal sheets composed of 304 stainless steel, 316 stainless steel, nickel, MONEL® nickel-copper alloy, inconel alloy 600, inconel alloy 625, carpenter stainless steel, carbon steel, Hastelloy® alloy B-2, and other metals and alloys thereof, and by welding a seam around the outer edges and in a selected pattern between the two sheets bonding the sheets at the weld junction.

Figure 16:
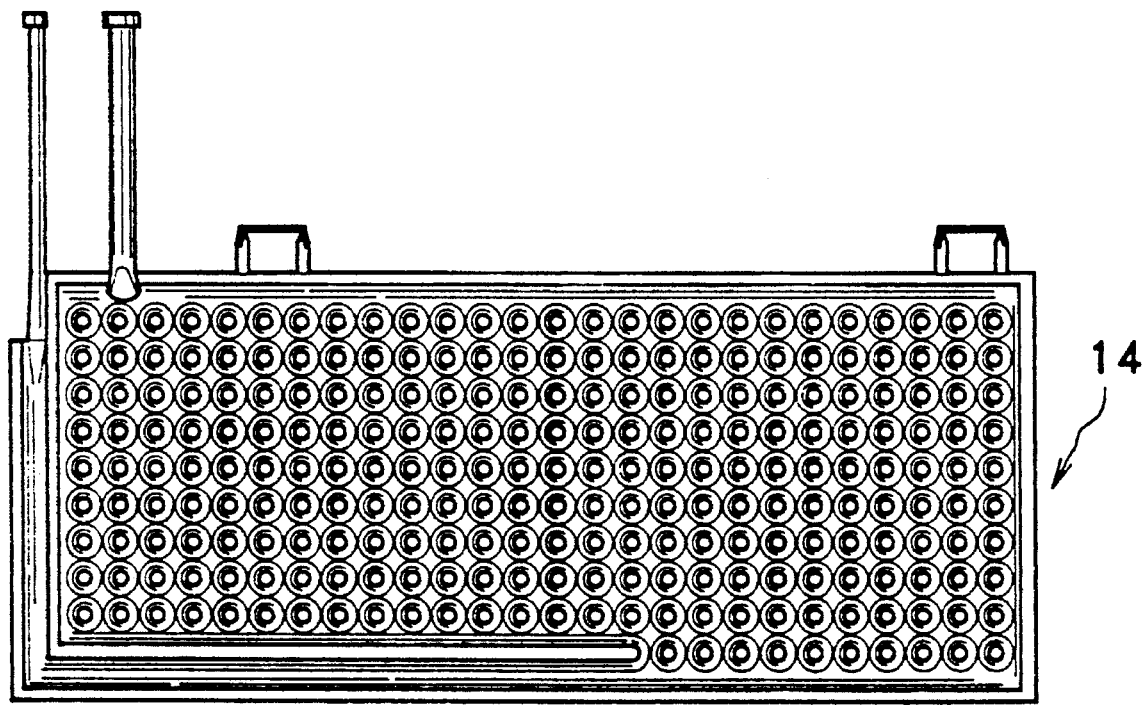
FIG. 16 is a perspective view showing a stainless steel tray of-the present invention having a quilted pattern produced by resistance spot and seam welding.
Figure 17:
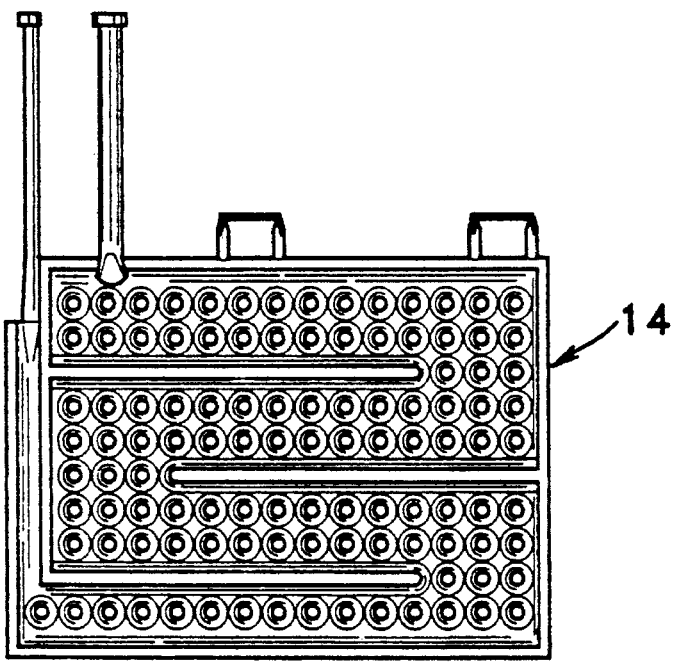
FIG. 17 is a perspective view showing a stainless steel tray of the present invention having a quilted serpentine pattern produced by resistance spot and seam welding.

Resistance spot welding requires pressing two sheets of metal together, preferably steel, and more preferably stainless steel. Two electrodes are used to apply a current through the two sheets of metal. Due to the resistance to electrical flow at the metal contact surfaces, the area thereinbetween heats up and forms a small molten puddle. As the pressure is retained and the current shut off, the molten puddle freezes forming the weldment between the two meal sheets such as shown in FIGS. 16–21. FIG. 16 shows a typical quilted pattern having resistance spot and seam welding, and FIG. 17 shows a quilted serpentine pattern having resistance spot and seam welding.

Resistance seam welding is produced by a series of overlapping spot-welds. Current passes through the metal as a wheel shaped electrode rolled over the sheets held together by pressure. The width and length of the spot welds can be controlled by the width of the electrode and the current on-off time.

Figure 18:
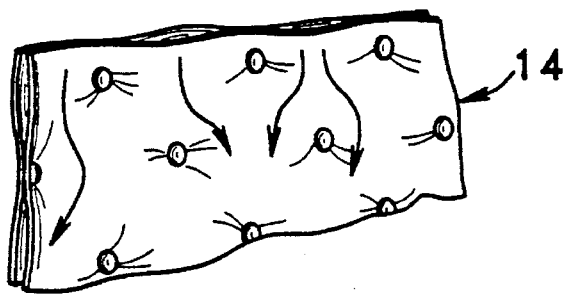
FIG. 18 is a perspective view of a stainless steel plate of the present invention produced by resistance welding multiple spot welds at the desired points to increase the strength of the plate increase the heat transfer between the sheets and the heat transfer liquid circulating therethrough in a free flow pattern.
Figure 19:
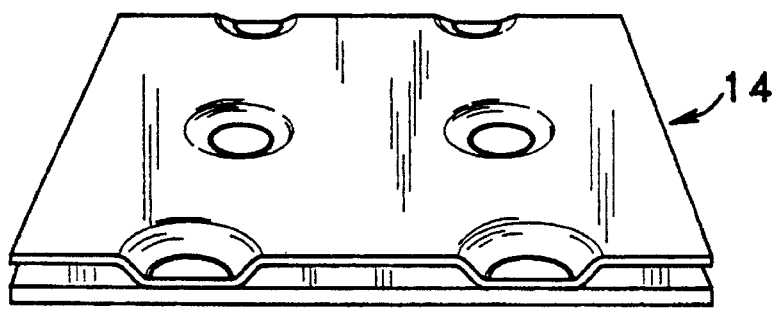
FIG. 19 is a perspective view of a dimple one sided plate.
Figure 20:
FIG. 20 is an enlarged front plan view of the dimple one sided plate shown in FIG. 19.

Multiple spot welds may be formed between the two sheets at the desired points to increase the strength of the plate 14 formed thereby, and increase heat transfer between the sheets and the liquid circulating therethrough in a free flow pattern as shown in FIG. 18. The specially designed heat transfer plate 14 configuration may utilize sheets 46, 48 which are spot-welded and high-pressure expanded with one side flat with the second side slightly pillowed or dimpled which is the preferred method for utilizing stainless steel sheets. As shown in FIGS. 19 and 20, the dimple one sided plate 14 is constructed by machine punching end swaging the sheets prior to welding to increase the flow area in the passages thereinbetween.

The resistant welding techniques may also be employed to produce a single embossed surface plate 14, wherein the plate 14 is comprised of two sheets of material of different thicknesses and one side is inflated as shown in FIGS. 21 and 22 providing a flat surface on one side of the plate 14.

The resistant welding techniques may also be employed to produce a double embossed surface plate 14, wherein the plate 14 is comprised of two sheets of material of different thicknesses and both sides are inflated as shown in FIGS. 23 and 24.

The above described manufacturing techniques are further enhanced by the option of subjecting the impact-bonded, or roll-bonded aluminum plate 14 to deep-drawing operations. In the deep drawing procedure, the entire roll-bonded tray 14 is pulled by vacuum into a mold (not shown) forming a deep-drawn or deep-well tray 108 according to the desired shape of the mold as shown in FIG. 25 formed from a resistant welded plate having both a deep-drawn first sheet top surface 109 and deep-drawn second sheet bottom surface 111.

Figure 26:
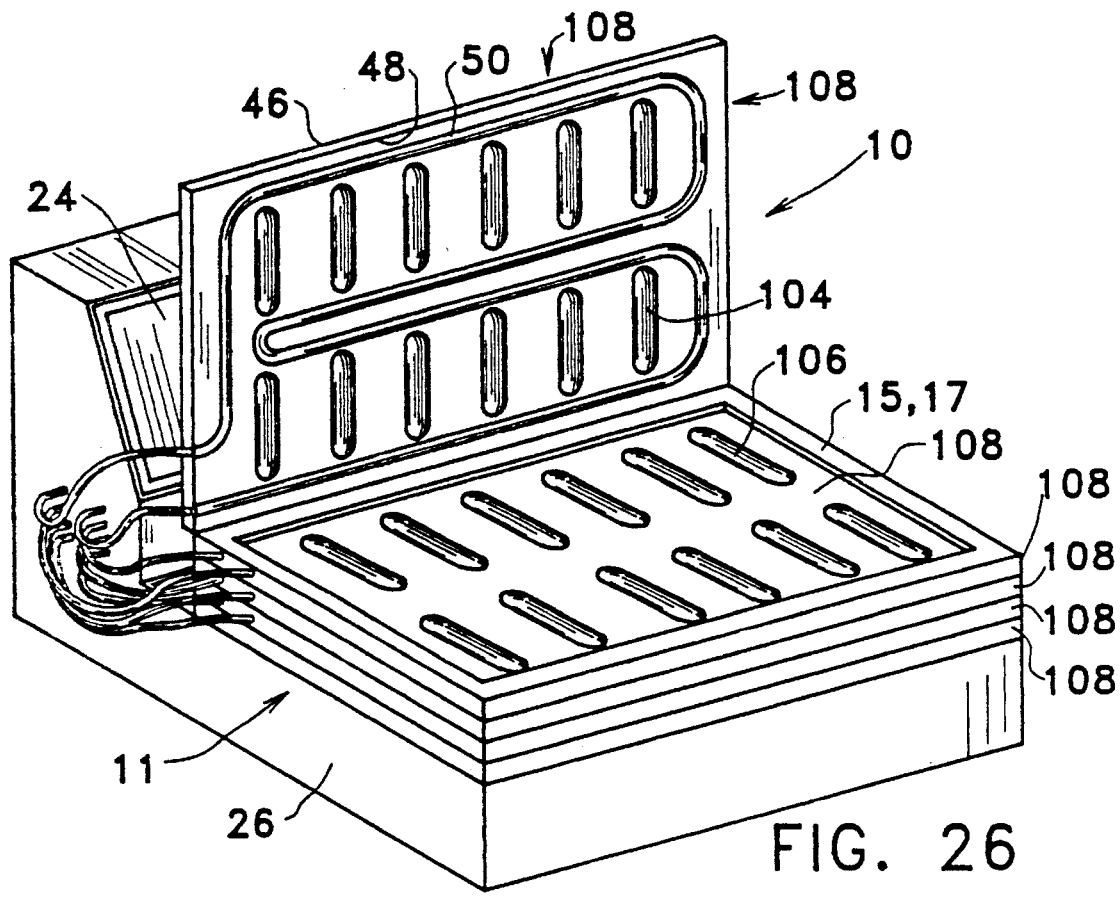
FIG. 26 is perspective view of cook and staging grill of FIG. 7, showing plates formed having depressions for containing food articles therein between the plates.
Figure 27:
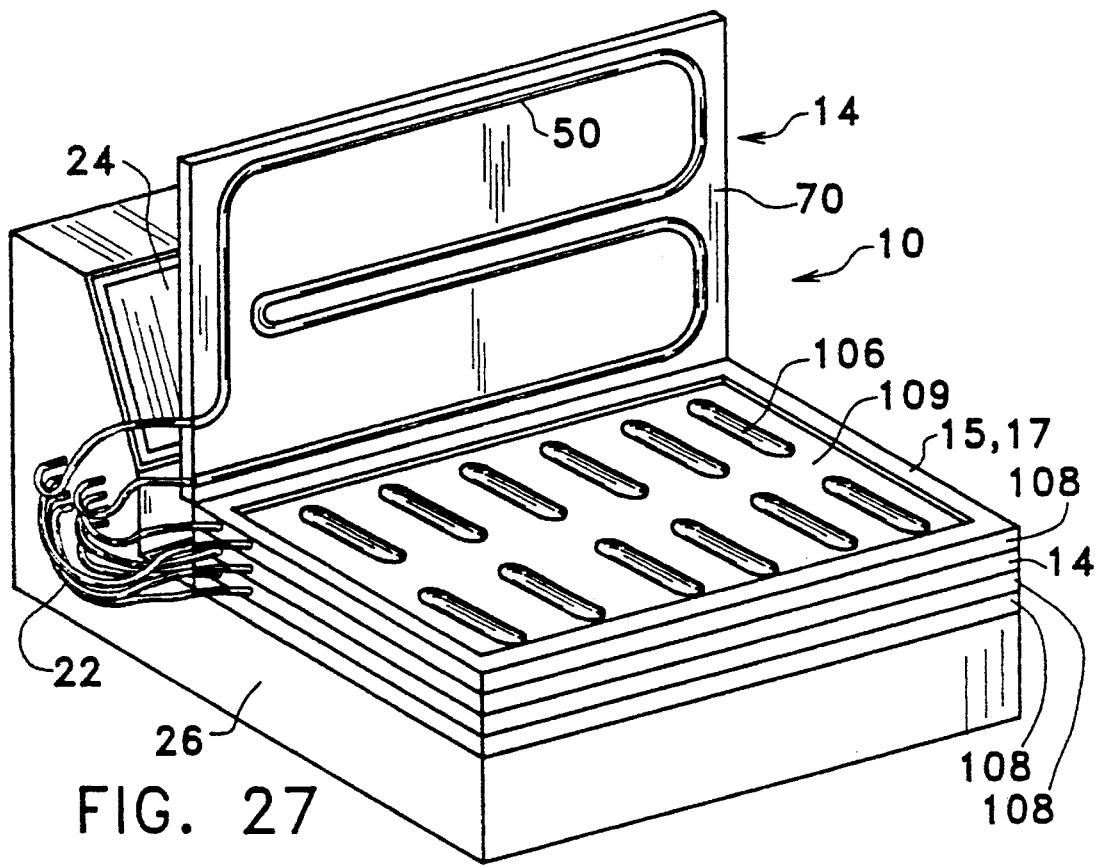
FIG. 27 is perspective view of cook and staging grill of FIG. 26, showing smooth plates in combination with plates formed having depressions for containing food articles therein between the plates.

Depressions 104 formed within the deep-drawn tray 108 of the present invention may be designed to form shallow vessels 106 having raised walls ranging from about ½inch to about 14 inches deep in one or both sheets 109, 111, and still maintain the thin high heat transfer advantages of the flat roll bonded plate 14 as illustrated in FIGS. 26 and 27. The vessel(s) 106 produced may be formed having a shape that is round, elliptical, rectangular, or any desired food shape configuration.

For example, as shown in FIG. 26, oblong shaped vessels 106 may have depressions 104 which extend downwardly from the deep-drawn first top sheet 109 and upwardly from the deep-drawn second bottom sheet 111 wherein the vessels 106 are arranged in a staggered formation between the deep-drawn trays 108. As shown in FIG. 27, the cook and staging grill 10 may have a combination of formed deep-drawn trays 108 containing vessels 106 formed between flat plates 14 and deep-drawn plates 108, or vessels 106 formed extending downwardly from a deep-drawn first top sheet 109 toward a flat first bottom sheet 70, wherein the thickness of the frame 15, 17 provides a spacing and sealing means between flat plates 14 and the formed deep-drawn trays 108. The deep-drawn plates 108 may also having additional heat transfer capacity due to having a greater surface area in contact with the heated food article 13.

The deep-drawn trays 108 may be designed to heat the vessel 106 and food products 13 contained directly in the vessel 106, or to heat food contained in a prepackaged container, such as a frozen "TV" dinner or soup, held within the vessel 106 to a cooked equilibration temperature of up to 205° F., ±1° F., from a frozen state, refrigerated state, or ambient state. The process is applicable to precooked, or fresh to-be-cooked food articles 13.

FIG. 26 is perspective view of cook and staging grill of FIG. 7, showing plates formed having depressions or vessels 106 for containing food articles 13 therein formed between the deep-drawn plates 108. As illustrated in FIG. 26, the formed heat exchange deep-drawn plates 108 can be designed to receive round or elliptical food articles 13 (such as hot dogs, knockwurst, sausage and brats), whereby two contiguous plates 108, each conforming to a half-diameter of a food product 13, oppose each other in such manner that the half-diameter profile configurations will surround the round or elliptical food article 13, thereby enabling the food article 13 to be placed between the two plates 108 for high-speed thermalization and staging procedures into the conductive equivalent of a round (or elliptical) configuration. This unique and novel heat exchange design, under which food articles 13 are thermalized via recirculating heat exchange fluids in pillow-expanded, fluid-traveling channels within the formed plates 100, provides far greater food safety during thermalization and staging processes, than the currently utilized, heated "rolling pin" or hot water devices now in practice for this purpose in the industry.

The cook and staging grill 10 is designed to retain food articles 13 in a clamped state or a nested state, via either horizontal or vertical fastening mechanisms, such as the hinges 54, for the time period required to assure sufficient internal product temperature equilibration (i.e., the time period required to meet the time-temperature pathogen lethality curves determined by the USDA and FDA to guarantee effective pathogenic risk management). Under the federal guidelines for thermal kill of food-borne pathogens, wherein food articles are rendered safe for consumption by exposure to required temperatures for minimum time spans, the opportunity to stage (i.e., hold) the food articles 13 for extended time periods and to serve same as dictated by customer demand is accomplished efficiently with the cook and staging grill 10 of the present invention.

The control process for the cook and staging grill 10 is accomplished by connecting the thermally conductive grill plates 14, 108 to an electronic monitoring means 110. Moreover, in the preferred embodiment, the control means comprises a computerized control system and alarm system 24 controlling the process and recording the time and temperature variables for the multi-deck cook and staging grill 10. Each cook and staging grill plate 14, 108 has one or more thermocouples 42 inserted into one or more of the food articles 13 for measuring internal product temperature, in order to achieve the most critical functions of control over specific, pathogen lethality time-temperature exposures and subsequent cook and staging periods. Each thermocouple 42 is connected (i.e., imbedded or attached) to a selected protrusion 62 on the underside of the grill plate 14, 108 for penetrating the food article placed in that position, permitting measurement and on-site read-out of its internal temperature. Furthermore, the thermocouple 42 is capable of delivering constant internal product temperature-monitoring information through an electrical connection means such as an electrical cable (not shown) from its position on the lower grill 10 surface's protruding member 62 to a microprocessor unit or computer 114.

The computer 114 controls the process and receives output data from the pump 20, heater 18, and timer 116. The computer 114 records the time, temperature, and batch data from at least one limit switch 118 (not shown) electromechanically linked to at least one safety lock, preferably a magnetic lock 58 for each individual plate or tray 14, 108. The computer 114 in the preferred embodiment is adapted to process input from up to ten thermocouples 42 in contact with the food articles 13 for precise monitoring or the internal product temperature throughout the cook and staging process continuously or at specified time intervals. The temperature in measured microseconds and displayed on the instrument control panel 38 with LED or other light displays, such as shown in FIG. 2, containing red (in process) indicator lights 122, green (ready to serve) indicator lights 124, time indicators 126 for each individual tray, and at least one temperature indicator 128 which can indicate the temperature of any individual thermocouple 42 or for each tray 14,108. It is contemplated that each tray 14, 108 may have an individual temperature indicator 128. Upon closing the tray 14 containing food articles 13, the magnetic lock becomes engaged and the red light indicator 122 comes on. During the heating cycle the red indicator light 122 remains on and the rising temperature of the tray 14 is observed through the temperature indicator 128. When the food articles 13 have reached the desired preset temperature for the desired preset time the temperature indicator will indicate the equilibration temperature has been reached, the green indicator light 124 will turn on, the red indicator light 122 will turn off, and the magnetic lock 58 is released or rendered releasable permitting the tray 14 to be opened and raised providing access to the food articles 13 for serving. The computer 114 records the time and temperature data providing proof that the food articles 13 were processed in the cook and staging grill 10 for at least the minimum time and temperature necessary to achieve thermal lethality for the *Escherichia coli* 157:H7 bacteria or for the desired time and temperature parameters needed to achieve thermal lethality of any other pathogen and guarantee a safe food product 13 for the consumer.

Figure 28:
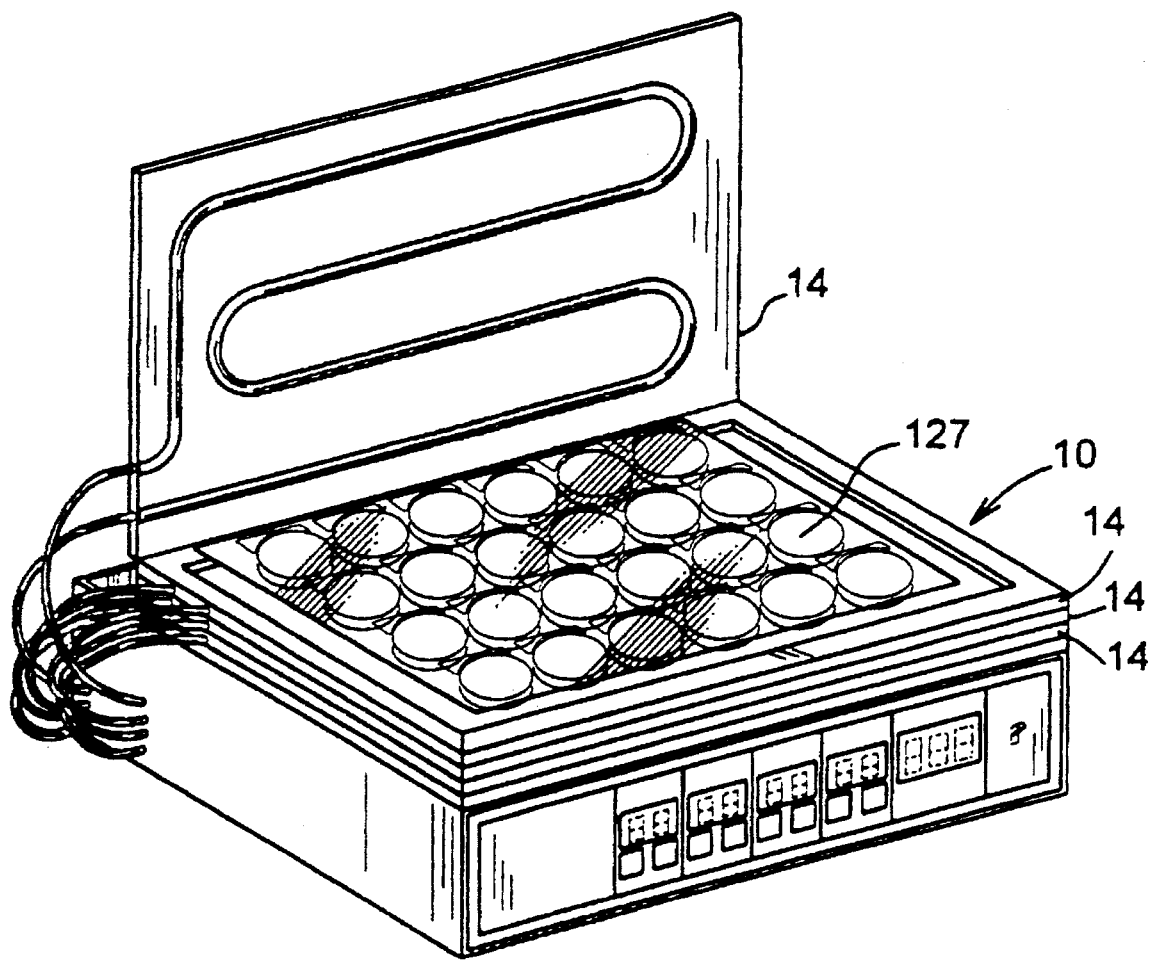
FIG. 28 is a perspective view of the cook and staging grill showing heating food articles contained in sealed heat conducting pouch containers.

Using the clamshell cook and staging grill 10 of the present invention involves a simple procedure due to the automation and control of the device. For example, the cook and staging grill 10 is preheated to about 160° F. Frozen ¼ pound meat patties, such as a hamburger patties, beef, pork, chicken meat, egg or vegetable patties encased in air evacuated plastic pouches 127 or other containers, as shown in FIG. 28 at about 0° F. to about 40° F. are placed on the upper heating surface of a first tray 14 and a second upper tray 14 hingably connected thereto is closed holding the meat patties thereinbetween. Closing the tray 14 activates the thermocouples 42 and temperature indicators 128, red in process light 122, timer 116, magnetic lock 58 , and computerized controller and alarm system 24. The preheated trays 14 heat the meat patties to about 160°±2° F. in about ten to about 17 minutes. The time and temperature is recorded by the microprocessor 24 and shown visually on the indicators 128. The computer 24 monitors the process and records the temperature of the hamburger patties on each tray 14. Upon reaching the preselected temperature of 160° F. a green indicator light 124 flashes and an audible alarm sounds indicating the hamburger patties are fully cooked, pathogenically safe, and ready for serving. The lock 120 is disengaged and the tray 14 is lifted manually or automatically by a mechanical device.

Figure 29:
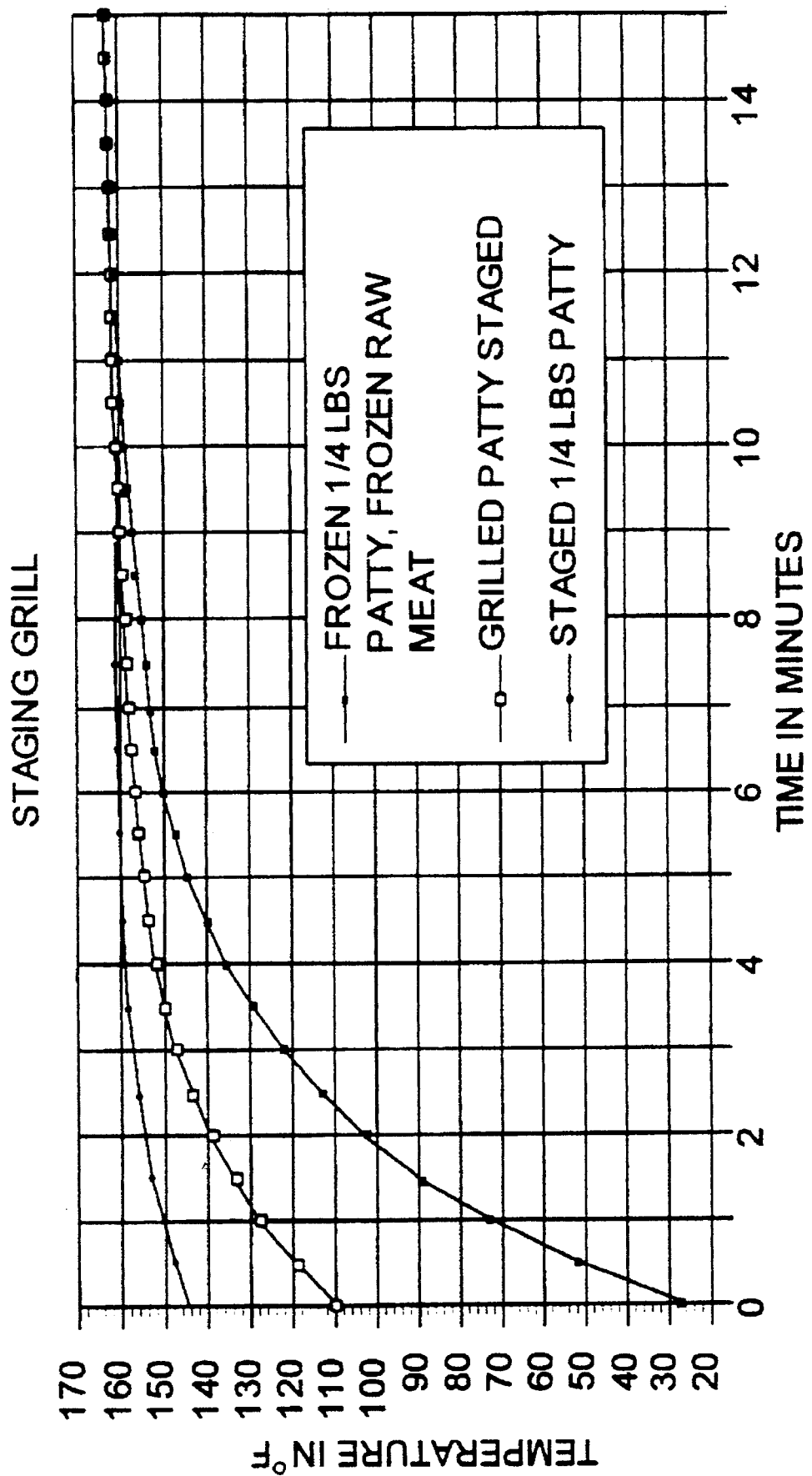
FIG. 29 is a graph showing the time versus temperature relationship for heating frozen meat patties using the present invention.

As illustrated in FIG. 29, a temperature and time graph shows typical curves produced using the cooking and staging grill 10 wherein frozen ¼ pound meat patties or chilled fresh raw meat patties at about 0° F. to 30° F. are heated to about 160° F. in about ten to seventeen minutes; pre-grilled patties are heated from about 110° F. to about 160° F. in about eight minutes; and staged ¼ pound meat patties are heated from about 145° F. to about 160° F. in about five minutes. The cook and staging grill 10 is capable of maintaining the selected temperature and product therein in first quality condition in pouch 127 form from about four to about six hours.

Moreover, the computer 114 is connected to a computerized temperature monitoring data transmitter 130. The data transmitter 130 transmits accurate, up-to-the-minute temperature-monitoring information, from any individual restaurant, to a central data recipient, thereby enabling regulation and monitoring of compliance and comparative efficiency, at separate retail outlets, by the central data recording entity.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims.

I claim:

1. A clamshell grill cooking and staging process for pathogenic risk management, comprising the steps of:

placing at least one food article sealed within a heat conducting container between a pair of heat transfer plates of a clamshell cooking and staging grill comprising a top plate, a bottom plate, and at least one intermediate plate, spaced apart and in alignment with one another, the top plate and the at least one intermediate plate being hingedly mounted to a housing frame by a floating hinge means;

heating a heat transfer fluid contained within a reservoir in fluid connection with the top plate, the bottom plate, and the at least one intermediate plate to a selected temperature at less than 212° F.;

controlling the selected temperature of the heat transfer fluid within the reservoir at about ±2° F.;

recirculating the heat transfer fluid through the plates in fluid-connection with the reservoir;

sensing the temperature of the heating fluid, each individual plate, or the food article sealed within the heat conducting container, for controlling the temperature thereof; and cooking the at least one food article sealed within the heat conducting container at a selected temperature for a selected period of time achieving pathogenic lethality of the at least one food article sealed in the heat conducted container.

2. The clamshell grill cooking and staging process recited in claim 1, including the steps of recording the time and the temperature for the at least one food article sealed within the heat conducting container for each individual plate.

3. The clamshell grill cooking and staging process as recited in claim 1, including the step of recording and displaying an internal temperature of the at least one food article sealed within the heat conducting container on an instrument control panel using light displays with an electronic computerized control system.

4. The clamshell grill cooking and staging process of claim 1, including the step of providing an electronic computerized control system for recording the time and temperature data providing proof that the at least one food articles sealed within the heat conducting container have been processed for at least the minimum time and temperature necessary to kill the bacteria or for the desired time and temperature parameters needed to kill any other pathogen.

5. The clamshell grill cooking and staging process of claim 1, including the step of activating at least one "ready" indicator light, at least one "in-process" indicator light, at least one temperature indicator, and at least one time indicator for each individual plate.

6. The clamshell grill cooking and staging process of claim 1, including the step of controlling the temperature of the heat transfer fluid that is heated such that no latent heat of vaporization is supplied thereto by cooking the at least one food article sealed within the heat conducting container with the heat transfer fluid and the temperature of the product and staging grill surface remain below 212° F.

7. The clamshell grill cooking and staging process of claim 1, including the step of holding the at least one food article sealed within the heat conducting container at a temperature from about 155° F. to about 185° F.

8. The clamshell grill cooking and staging process of claim 1, including the step of controlling the temperature of the at least one food article sealed within the heat conducting container at a selected temperature at about ±2° F.

9. The clamshell grill cooking and staging process of claim 1, including the step of maintaining the at least one food article sealed within the heat conducting container at a bacteriologically safe temperature without any moisture loss or degradation of the at least one food article sealed within the heat conducting container resulting in perfect quality for prolonged time spans exceeding at least 30 to 40 minutes.

10. The clamshell grill cooking and staging process of claim 1, including the step of holding at least one previously cooked food article sealed within the heat conducting container at a precise internal temperature for prolonged time period within the narrow equilibration range of about ±2° F. thereby assuring precision, time-related and temperature-related, pathogenic risk management.

11. The clamshell grill cooking and staging process of claim 1, including the step of providing a precise, uniform temperature achieving consistent repetition of internal temperature equilibration within the narrow internal product temperature range of about ±2° F., in either frozen fresh, precooked or refrigerated fresh hamburger patties, and providing a means of holding the at least one food article sealed within the heat conducting container for selected prolonged time periods at an equilibrated, safe internal temperature range between about 130° F. to about 185° F., in order to guarantee bacteriological food safety by achieving 99% thermal lethality of trace pathogens.

12. The clamshell grill cooking and staging process of claim 1, including the step of cooking and holding the at least one food article sealed within the heat conducting container at the same equilibrated temperature of from about 130° F. to about 185° F.

13. The clamshell grill cooking and staging process of claim 1, wherein the at least one food article sealed within the heat conducting container are frozen.

14. The clamshell grill cooking and staging process claim 1, wherein the heat conducting container is a flexible pouch.

15. A clamshell grill cooking and staging process for pathogenic risk management, comprising the steps of:

placing at least one food article sealed within a heat conducting container between a pair of heat transfer plates of a clamshell cooking and staging grill comprising a top plate, a bottom plate, and at least one intermediate plate, spaced apart and in alignment with one another, the top plate and the at least one intermediate plate being hingedly mounted to a housing frame by a floating hinge means;

heating a heat transfer fluid contained within a reservoir in fluid connection with the top plate, the bottom plate, and the at least one intermediate plate to a selected temperature at less than 212° F.;

controlling the selected temperature of the heat transfer fluid within the reservoir at about ±2° F.;

recirculating the heat transfer fluid through the plates in fluid-connection with the reservoir;

sensing the temperature of the heating fluid, each individual plate, or the at least one food article sealed within the heat conducting container for controlling the temperature thereof;

heating the at least one food article sealed within the heat conducting container at a selected temperature for a selected period of time achieving pathogenic lethality of the at least one food article sealed within the heat conducted container; and controlling the internal product temperature of the at least one food article sealed within the heat conducting container for holding the at least one food article at a desired equilibration temperature for serving and maintaining the pathogenic lethality of the at least one food articles sealed within the heat conducting container.

16. The clamshell grill cooking and staging process recited in claim 15, including the steps of recording the time and the temperature for the at least one food article sealed within the heat conducting container for each individual plate.

17. The clamshell grill cooking and staging process as recited in claim 15, including the step of recording and displaying an internal temperature of the at least one food article sealed within the heat conducting container on an instrument control panel using light displays with an electronic computerized control system.

18. The clamshell grill cooking and staging process of claim 15, including the step of providing an electronic computerized control system for recording the time and temperature data providing proof that the at least one food articles sealed within the heat conducting container have been processed for at least the minimum time and temperature necessary to kill the bacteria or for the desired time and temperature parameters needed to kill any other pathogen.

19. The clamshell grill cooking and staging process of claim 15, including the step of activating at least one "ready" indicator light, at least one "in-process" indicator light, at least one temperature indicator, and at least one time indicator for each individual plate.

20. The clamshell grill cooking and staging process of claim 15, including the step of controlling the temperature of the heat transfer fluid that is heated such that no latent heat of vaporization is supplied thereto by cooking the at least one food article sealed within the heat conducting container with the heat transfer fluid and the temperature of the product and staging grill surface remain below 212° F.

21. The clamshell grill cooking and staging process of claim 15, including the step of holding the at least one food article sealed within the heat conducting container at a temperature from about 155° F. to about 185° F.

22. The clamshell grill cooking and staging process of claims 15, including the step of controlling the temperature of the at least one food article sealed within the heat conducting container at a selected temperature at about ±2° F.

23. The clamshell grill cooking and staging process of claim 15, including the step of maintaining the at least one food article sealed within the heat conducting container at a bacteriologically safe temperature without any moisture loss or degradation of the at least one food article sealed within the heat conducting container resulting in perfect quality for prolonged time spans exceeding at least 30 to 40 minutes.

24. The clamshell grill cooking and staging process of claim 15, including the step of holding at least one previously cooked food article sealed within the heat conducting container at a precise internal temperature for prolonged time period within the narrow equilibration range of about ±2° F. thereby assuring precision, time-related and temperature-related, pathogenic risk management.

25. The clamshell grill cooking and staging process of claim 15, including the step of providing a precise, uniform temperature achieving consistent repetition of internal temperature equilibration within the narrow internal product temperature range of about ±2° F., in either frozen fresh, precooked or refrigerated fresh hamburger patties, and providing a means of holding the at least one food article sealed within the heat conducting container for selected prolonged time periods at an equilibrated, safe internal temperature range between about 130° F. to about 185° F., in order to guarantee bacteriological food safety by achieving 99% thermal lethality of trace pathogens.

26. The clamshell grill cooking and staging process of claim 15, including the step of cooking and holding the at least one food article sealed within the heat conducting container at the same equilibrated temperature of from about 130° F. to about 185° F.

27. The clamshell grill cooking and staging process of claim 15, wherein the at least one food article sealed within the heat conducting container are frozen.

28. The clamshell grill cooking and staging process claim 15, wherein the heat conducting container is a flexible pouch.

* * * * *